(12) United States Patent
Kunieda

(10) Patent No.: US 7,623,158 B2
(45) Date of Patent: Nov. 24, 2009

(54) IMAGE SENSING APPARATUS AND CONTROL METHOD

(75) Inventor: Shutaro Kunieda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 632 days.

(21) Appl. No.: 11/556,736

(22) Filed: Nov. 6, 2006

(65) Prior Publication Data

US 2007/0103561 A1 May 10, 2007

(30) Foreign Application Priority Data

Nov. 8, 2005 (JP) .............................. 2005-324050
Jul. 28, 2006 (JP) .............................. 2006-207169

(51) Int. Cl.
*H04N 5/225* (2006.01)
*H04N 5/76* (2006.01)
*H04N 7/00* (2006.01)

(52) U.S. Cl. .............................. 348/220.1; 348/231.99; 386/107

(58) Field of Classification Search .............. 348/220.1, 348/231.2, 231.3, 231.4, 231.6, 349; 386/107, 386/117
See application file for complete search history.

(56) References Cited

U.S. PATENT DOCUMENTS

| | | | | |
|---|---|---|---|---|
| 4,714,963 A | * | 12/1987 | Vogel | ....................... 348/220.1 |
| 4,837,628 A | * | 6/1989 | Sasaki | ....................... 348/220.1 |
| 5,335,042 A | * | 8/1994 | Imafuji et al. | ....................... 396/55 |
| 6,937,273 B1 | * | 8/2005 | Loui | ....................... 348/220.1 |
| 7,432,957 B2 | * | 10/2008 | Yokoi | ....................... 348/220.1 |
| 2001/0040626 A1 | * | 11/2001 | Ohta et al. | ....................... 348/220 |
| 2002/0140826 A1 | * | 10/2002 | Sato et al. | ....................... 348/222.1 |

FOREIGN PATENT DOCUMENTS

JP        2004-201282        7/2004

* cited by examiner

*Primary Examiner*—Tuan Ho
*Assistant Examiner*—Trung Diep
(74) *Attorney, Agent, or Firm*—Cowan, Liebowitz & Latman, P.C.

(57) ABSTRACT

The present invention allows still images to be recorded during moving image recording, and does not require frame data to be generated and written for all frames missed as a result of the still image recording. Thus, when the recording of a still image is instructed during moving image recording, the moving image recording is interrupted, and the number of moving image frames missed during the still image recording is counted. The still image obtained by an image sensing device is shot, and the shot still image data is stored on a memory card. Next, a pseudo moving image frame is generated from the still image data and appended to the interrupted moving image file. Moving image recording is then resumed. Offsets are adjusted at this time so that the counted missing frames point to the pseudo frame.

10 Claims, 21 Drawing Sheets

FIG. 10

| MOVING IMAGE FRAME | OFFSET VALUE | OFFSET NO. |
|---|---|---|
| FRAME 1 | 100 | OFFSET 1 |
| FRAME 2 | 200 | OFFSET 2 |
| FRAME 3 | 290 | OFFSET 3 |
| FRAME 4 | 400 | OFFSET 4 |
| FRAME 5 | 500 | OFFSET 5 |
| FRAME 6 | 600 | OFFSET 6 |
| FRAME 7 | 700 | OFFSET 7 |
| FRAME 8 | 810 | OFFSET 8 |
| FRAME 9 | 920 | OFFSET9 |

FIG. 11

| MOVING IMAGE FRAME | OFFSET VALUE | OFFSET NO. |
|---|---|---|
| FRAME 1 | 100 | OFFSET 1 |
| FRAME 2 | 200 | OFFSET 2 |
| FRAME 3 | 290 | OFFSET 3 |
| MOVING IMAGE FRAME S | 400 | OFFSET 4 |
| FRAME 7 | 400 | OFFSET 5 |
| FRAME 8 | 400 | OFFSET 6 |
| FRAME 9 | 500 | OFFSET 7 |
|  | 610 | OFFSET 8 |
|  | 720 | OFFSET9 |

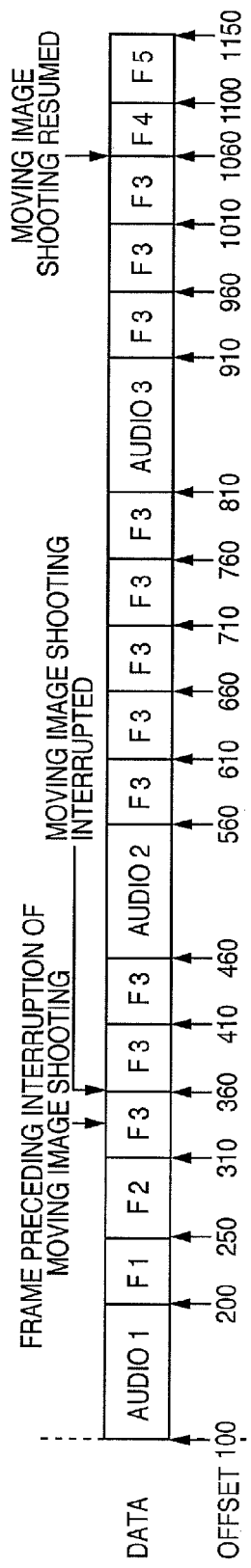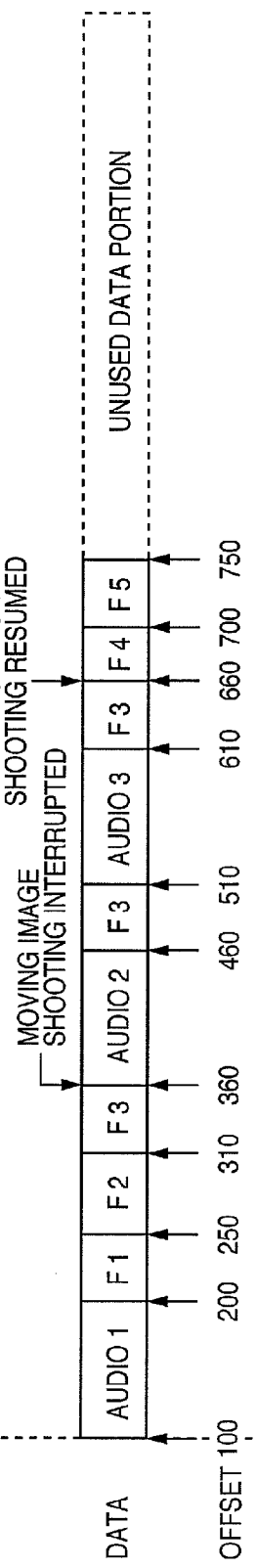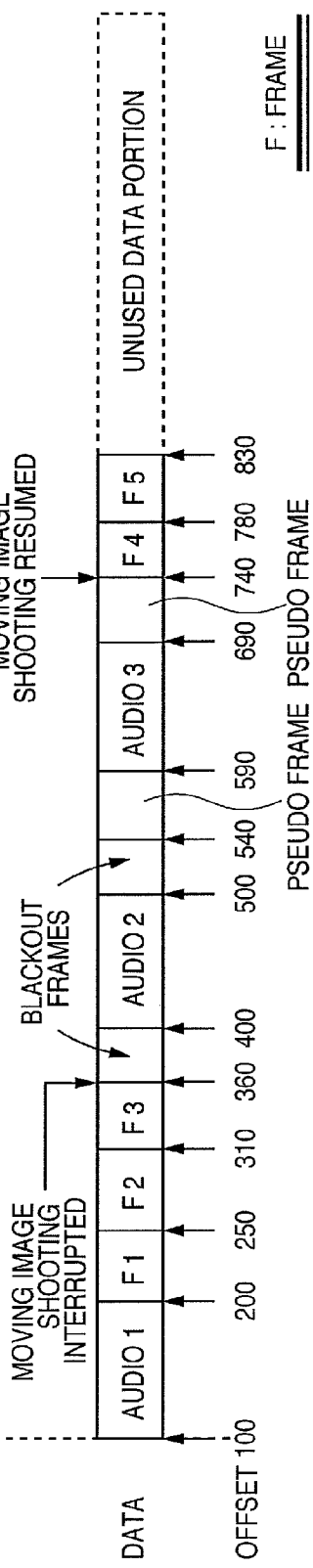

FIG. 18A

| OFFSET NO. | DATA SIZE | OFFSET VALUE |
|---|---|---|
| 1 | 100 | 100 |
| 2 | 50 | 200 |
| 3 | 60 | 250 |
| 4 | 50 | 310 |
| 5 | 50 | 360 |
| 6 | 50 | 410 |
| 7 | 100 | 460 |
| 8 | 50 | 510 |
| 9 | 50 | 560 |
| 10 | 50 | 610 |
| 11 | 50 | 660 |
| 12 | 50 | 710 |
| 13 | 100 | 810 |
| 14 | 50 | 910 |
| 15 | 50 | 960 |
| 16 | 50 | 1010 |
| 17 | 40 | 1050 |
| 18 | 50 | 1100 |

DURING STILL IMAGE PROCESSING (rows 5–16)

PRIOR ART

| OFFSET NO. | DATA SIZE | OFFSET VALUE |
|---|---|---|
| 1 | 100 | 100 |
| 2 | 50 | 200 |
| 3 | 60 | 250 |
| 4 | 50 | 310 |
| 5 | 50 | 310 |
| 6 | 50 | 310 |
| 7 | 100 | 360 |
| 8 | 50 | 460 |
| 9 | 50 | 460 |
| 10 | 50 | 460 |
| 11 | 50 | 460 |
| 12 | 50 | 460 |
| 13 | 100 | 510 |
| 14 | 50 | 610 |
| 15 | 50 | 610 |
| 16 | 50 | 610 |
| 17 | 40 | 660 |
| 18 | 50 | 700 |

DURING STILL IMAGE PROCESSING (rows 4–16)

FIFTH EMBODIMENT

SIXTH EMBODIMENT

IMAGE SENSING APPARATUS AND CONTROL METHOD

BACKGROUND OF THE INVENTION

1. Field of the Invention

The present invention relates to an image sensing apparatus such as a digital camera and a control method for same.

2. Description of the Related Art

In recent years, digital cameras that convert an image signal of an object image sensed by an image sensing device such as a solid state image sensing device to a digital signal and record the image data of the digital signal onto a recording medium have become widespread. Some of these have a moving image shooting function with sound for simultaneously recording moving images and audio, in addition to a normal still image shooting function.

With these digital cameras, a still image shooting mode for shooting still images and a moving image shooting mode for shooting moving images are normally provided separately as shooting modes, with mode transition performed by a user operation such as a key operation.

A technique for shooting still images during moving image shooting is also known, e.g., JP 2004-201282A. According to this technique, still image recording is performed after interrupting moving image recording when shooting a still image during moving image recording. Once the still image has been recorded, the moving image recording is continued by repeatedly using, i.e., copying, the moving image frame data immediately preceding the interruption or the still image obtained by the still image shooting as substitute frame data for the number of frames during the interruption.

When the digital camera includes a mode for recording still images and a mode for recording moving images as described above, and a still image is shot during moving image recording, frames missed during the still image shooting need to be compensated for. Because the same frame data has conventionally been generated and stored repeatedly, the moving image file ultimately generated is overly long, leaving much room for improvement.

Further, the data of the plurality of interrupted frames as well as the still image data needs to be written to memory, creating additional load on the control circuit and the processor. Assuming that a control circuit and a processor with high processing capacity are inevitably required, problems also remain in terms of cost.

SUMMARY OF THE INVENTION

The present invention was made in view of the above points. The object of the present invention is to provide a technique for suppressing the size of moving image files when recording a still image during moving image recording, and for significantly reducing load on an apparatus resulting from recording moving image frames missed due to still image shooting.

To resolve these problems, for example, an image sensing apparatus of the present invention is provided with the following configuration. That is, an image sensing apparatus for recording image data image-sensed by image sensing means onto a prescribed storage medium, comprises moving image recording means for generating, with each piece of image data obtained as a result of sequential image-sensing by the image sensing means in accordance with a prescribed frame rate as frame data of a moving image, a moving image file on the storage medium by writing each piece of frame data and an offset value showing a storage address of each frame to the storage medium, judging means for judging whether still image recording has been instructed during the moving image recording by the moving image recording means, still image recording means for interrupting the moving image recording by the moving image recording means if it is judged by the judging means that still image recording has been instructed, and storing onto the storage medium a still image file with image data obtained by the image sensing means as a still image, adjusting means for generating a pseudo moving image frame from still image data obtained by the still image recording means and storing the generated pseudo moving image frame as part of the moving image file, and adjusting an offset of each missing frame that is not shot during a time period from when still image shooting by the still image recording means is started until when the still image file is stored onto the storage medium, so that the missing frame points to the pseudo moving image frame, and resuming means for resuming the moving image recording by the moving image recording means after the adjustment by the adjusting means.

According to the present invention, recording of still images during moving image recording is allowed, and the generation and writing of frame data for frames missed due to still image recording is greatly reduced in comparison to the conventional technique. Consequently, the size of moving image files that are generated can be reduced, and the load on the apparatus can also be significantly reduced.

Further features of the present invention will become apparent from the following description of exemplary embodiments, with reference to the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 shows the relation between offset values and moving image frames in a normal moving image file.

FIG. 11 shows an exemplary relation between offset values and moving image frames in a moving image file according to the first embodiment.

FIG. 17A shows moving image frames and audio data in a conventional moving image file.

FIGS. 17B and 17C show moving image frames and audio data in a moving image file according to the fifth and sixth embodiments.

FIG. 18A shows an exemplary conventional moving image file index.

DESCRIPTION OF THE EMBODIMENTS

Embodiments of the present invention are described in detail below in accordance with the accompanying drawings.

First Embodiment

Figure 1:
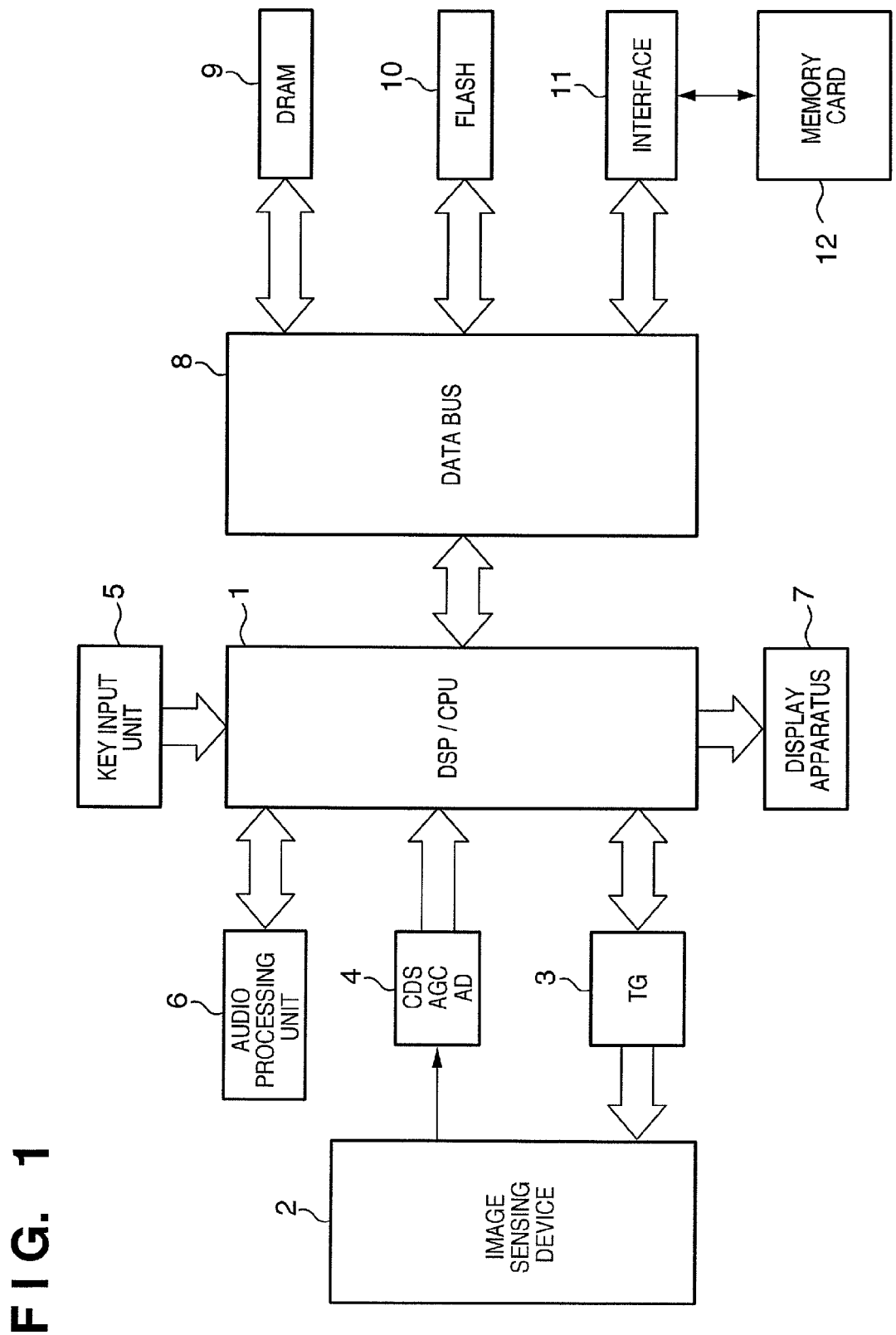
FIG. 1 is a block diagram of a digital camera according to the embodiments.

FIG. 1 is a block diagram of a digital camera as an image sensing apparatus according to the embodiments. The digital camera according to the present embodiment is provided with a moving image recording function and a moving image shooting function with sound, in addition to a normal still image recording function.

The digital camera has an image sensing device 2 and a DSP/CPU 1. The DSP/CPU 1 is a one-chip microcomputer that, in addition to having various digital signal processing functions including compression/decompression of image data and audio data processing, controls the various units of the digital camera.

A Time Generator, or TG, 3 that drives the image sensing device 2 is connected to the DSP/CPU 1. Also connected to the DSP/CPU 1 is a unit circuit 4 that inputs an analog image sensing signal that is dependent on the optical image of an object output from the image sensing device 2 to convert the image sensing signal to digital data. The unit circuit 4 is provided with a Correlated Double Sampling, or CDS, circuit that performs correlated double sampling on the image sensing signal output from the image sensing device 2 and holds the sampled data. The unit circuit 4 is further provided with a gain control amplifier, or AGC, that amplifies the image sensing signal, and an A/D converter, or AD, that converts the amplified image sensing signal to a digital signal. As a result, the output signal of the image sensing device 2 is sent to the DSP/CPU 1 as a digital signal after passing through the unit circuit 4.

A DRAM 9, an internal flash memory 10, and a card interface 11 are connected to the DSP/CPU 1 via an address data bus 8, together with a key input unit 5, an audio processing unit 6, and a display apparatus 7. A memory card 12 can be connected to the card interface 11 as a removable storage medium mounted in a slot (not shown) in the body of the digital camera.

The display apparatus 7 includes a color LCD and a drive circuit for driving the color LCD. When the digital camera is in a shooting standby state, the display apparatus 7 displays an object image that is image sensed by the image sensing device 2 on an EVF, i.e., EVF through-image display processing. Furthermore, the display apparatus 7, during recorded image playback, displays a recorded image, either a still image or a moving image, read from the memory card 12, which is a storage memory, and decompressed. The display apparatus 7 also performs menu display for various settings under the control of the DSP/CPU 1.

The key input unit 5 includes a plurality of operation keys such as a shutter button for shooting still images, a recording start/end button used in shooting moving images, a power key, and a menu key, and outputs a key input signal to the DSP/CPU 1 that is dependent on a key operation by a user. The shutter button is configured by a two-stage switch that outputs a different output signal in half stroke and full stroke states.

The audio processing unit 6 includes an internal microphone, an amplifier, an A/D converter, an internal speaker, a D/A converter and the like, and converts audio input to the internal microphone to a digital signal, sending the digital signal to the DSP/CPU 1 when shooting still images or moving images with sound. Audio data sent to the DSP/CPU 1 is sequentially accumulated in the DRAM 9, and ultimately recorded onto the memory card 12 together with image data generated by the DSP/CPU 1. Furthermore, the audio processing unit 6 outputs audio from the internal speaker by playing audio based on audio data attached to each image when playing still images or moving images with sound. The audio processing unit 6 also emits various notification sounds from the internal speaker as necessary.

The DRAM 9 is a buffer memory for temporarily storing digitized image data and the like of an object image sensed by the image sensing device 2, and is also used as the working memory of the DSP/CPU 1. The internal flash memory 10 stores control programs required in the control of the various units by the DSP/CPU 1, that is, programs required for various controls including auto focus, or AF, control, and auto exposure, or AE, control. Data required for the various controls are also stored in this internal flash memory 10. The DSP/CPU 1 functions as a digital camera by executing the above programs.

Processing in the digital camera according to the embodiment having the above configuration is described in accordance with the flowcharts of FIGS. 2-4 and FIG. 6. According to the embodiment, the digital camera has a still image recording mode and a moving image recording mode as shooting modes, and in the latter, the recording of still images is allowed even during moving image shooting. A selection menu is displayed on the display apparatus 7 when the menu key provided on the key input unit 5 is operated, and the selection of a mode is performed by operating the arrow keys and the enter key of the key input unit 5. Since the still image recording mode is similar to a normal digital camera, the case in which the moving image recording mode is selected is described here.

Figure 3:
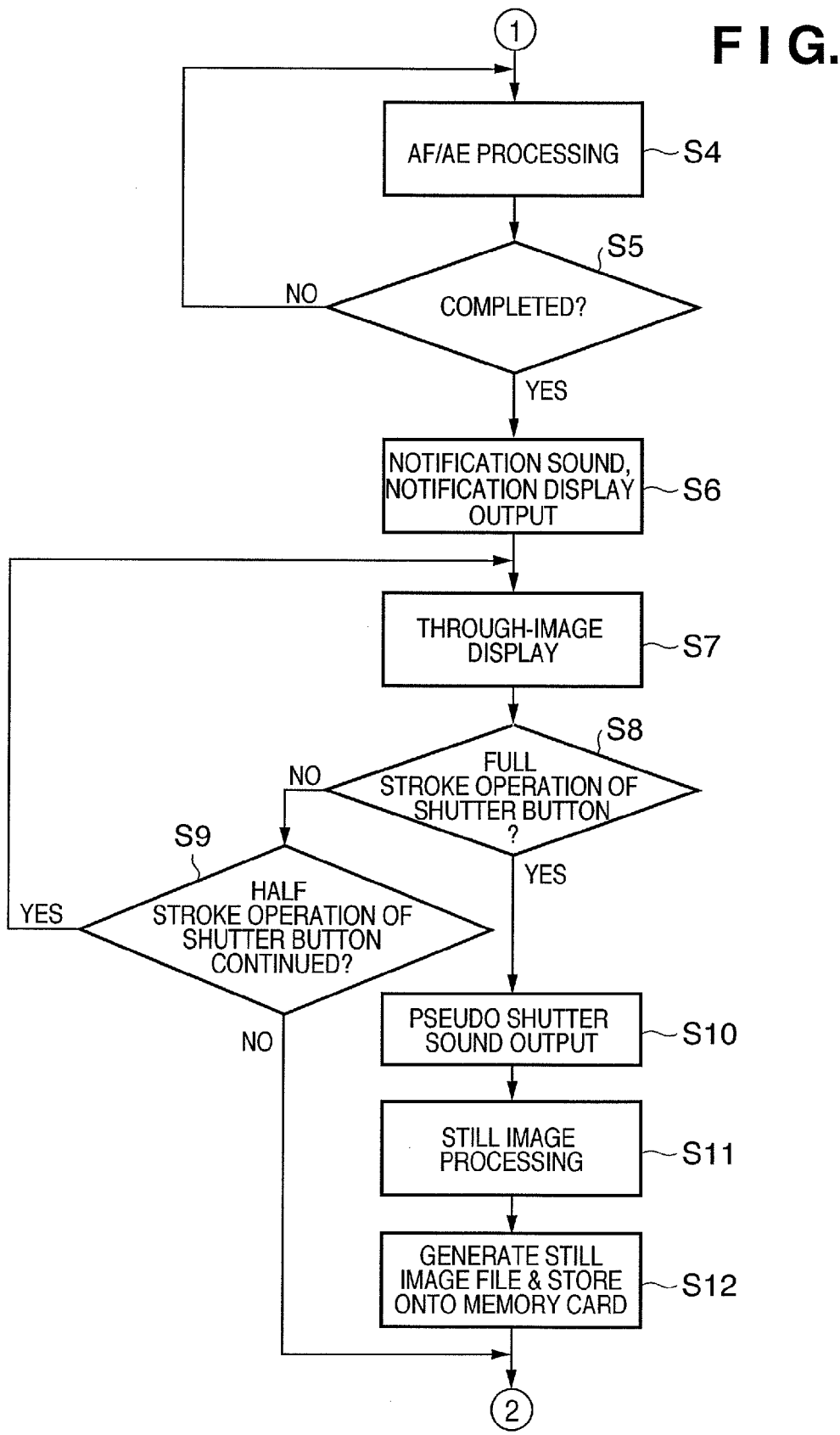
FIG. 3 is a flowchart showing a processing procedure of the digital camera according to the first embodiment.

Once the shooting mode has been set, the DSP/CPU 1 starts image sensing via the image sensing device 2 and display of an Electronic Viewfinder, or EVF, through image of the object on the display apparatus 7, in step S1. This display processing is repeated while there is no operation of the recording start button or half stroke operation of the shutter button of the key input unit 5, that is, steps S2 and S3 are both No. Then, when the recording start button is operated, that is, step S2 is Yes, the DSP/CPU 1 moves to the processing for recording a moving image with sound in step 13 onwards, or if there is a half stroke operation of the shutter button, that is, step S3 is Yes, the DSP/CPU 1 moves to the processing for shooting a still image as shown in FIG. 3, steps 4-12.

The still image shooting is described firstly. On detecting a half stroke operation of the shutter button, that is, step S3 is Yes, the DSP/CPU 1 sets the shooting conditions using AF processing and AE processing, as per step S4. When this is completed, that is, step S5 is Yes, the DSP/CPU 1 emits a notification sound via the speaker of the audio processing unit 6 and performs a notification display, such as a message, via the display apparatus 7 to let the user know that this processing has been completed, as per step S6. The DSP/CPU 1 then starts the image sensing by the image sensing device 2 under the set shooting conditions, and has the display apparatus 7 display an EVF through image, as per step S7. Here, processing returns to step S7, where the DSP/CPU 1 continues the EVF through-image display for the period during which the half stroke operation of the shutter button is continued without a full stroke operation of the shutter button, that is, step S8 is No, and step S9 is Yes.

On detecting a full stroke operation of the shutter button while an EVF through image is being displayed, that is, step S8 is Yes, a pseudo shutter sound prerecorded in the internal flash memory 10 is output from the speaker of the audio processing unit 6, as per step S10. The DSP/CPU 1 then starts still image processing such as image sensing by the image sensing device 2 of an object image for recording, and generating the image data of the object image, as per step S11. That is, the still image processing is made up of two types of processing. One type is processing for making the image sensing device 2 output a pixel signal for the even lines and odd lines in one screen in order at a relatively long output image-sensing timing, and converting the image sensing signal to a digital signal. The other type is processing for importing a full screen's worth of data to the buffer memory DRAM 9, and compressing the imported image data. When this is completed, the DSP/CPU 1 stores a still image file, i.e., a file in JPEG format, etc., based on the compressed image data onto the memory card 12, as per step S12. This ends the processing for generating a still image file. The processing then returns to step S1.

In other words, still images are shot and recorded as a result of very general processing similar to processing in a normal still image shooting mode. Note that if the half stroke of the shutter button is released while an EVF through image is being displayed, that is, step S9 is No, the DSP/CPU 1 immediately ends the still image recording, and processing returns to step S1. That is, processing for shooting a still image involves image sensing by the image sensing device 2 of an object image for recording, AE and AF processing, EVF through-image display, still image processing such as image data generation, and generating a still image file.

Processing for shooting a moving image with sound is described next.

On detecting that the moving image recording start button has been operated by a user, with an EVF through image displayed immediately after the setting of the shooting mode as described above, that is, step S2 is Yes, processing proceeds to step S13. At step S13, the DSP/CPU 1 starts moving image recording and the recording of audio data obtained by converting an audio signal input to the internal microphone of the audio processing unit 6 to audio data.

A detailed description of this moving image processing follows.

According to the embodiment, a moving image file ultimately stored onto the memory card 12 is assumed to be in Motion JPEG format. This is a file in which individual frames constituting the moving image are encoded using JPEG encoding technology, and the frames obtained as a result of the JPEG encoding are stored in order. Since JPEG is itself variable length coding, the encoded size of the frames varies. Consequently, an offset, that is, an offset address, is generated that depends on the size of the frames, and the address of the next frame is determined. In other words, a Motion JPEG format file is constituted by combining the encoded data and offsets of the frames.

FIG. 10 shows the relation between offsets and frames. Each offset value is determined, for example, by the data size of the temporally adjacent moving image frame. The value of offset 1 is 100, and when the data size of frame 1 is 100, the value of offset 2 will be 200. For example, the offset values of moving image frames 1 to 9 obtained by shooting a moving image are offsets 1 to 9. Consequently, it possible to play back from a desired frame in the case of Motion JPEG, since the addresses of desired frames are derived from the offsets, and frames can be decoded separately.

On detecting that the recording start button has been operated, the DSP/CPU 1 opens a new moving image file for writing on the memory card 12. At this time, the DSP/CPU 1 creates a header for the newly opened file, and generates and stores an initial offset in a prescribed area of the DRAM 9. If the frame rate is 30 fps, for example, image data, that is, moving image frames, obtained by the image sensing device 2 at 1/30 second intervals are thinned, dropping them to a VGA class resolution, and temporarily stored into the buffer memory DRAM 9. The frames thinned to VGA class are then JPEG encoded and written to the memory card 12.

The resolution is dropped because moving images are generally displayed on a display apparatus such as a television, and the display resolution of televisions at present is around the level of VGA, 600×480 dots. According to the embodiment, in order to reduce the processing for dropping the resolution as much as possible, only the data of odd lines is extracted from image data obtained by the image sensing device 2, with even lines discarded, and written to the buffer memory, thereby reducing the information volume from the outset. The processing for dropping the resolution is performed after this. Consequently, if the possible number of pixel for image sensing by the image sensing device 2 is extremely large, thinning may be performed after extracting only one line in n number of lines, instead of odd lines.

Once the JPEG encoding has ended, the encoded data of the current frame is stored in an output buffer secured in the DRAM 9 for writing to the memory card 12. Since the encoded data volume of the current frame is known at this time, the offset of the current frame is generated and stored in the DRAM 9 by adding this data volume to the offset value of the previous frame. The offset value of the current frame is used as the offset for the encoded data of the next frame.

Note that while also depending on buffer size, the encoded data stored in the output buffer is written to the memory card 12 under the control of the DSP/CPU 1 at the stage at which the sufficiency of the data exceeds a prescribed value. Further, because audio data is included, the offset values are in fact tempered with the audio data. Description of the actual structure of a Motion JPEG file with sound, being commonly known art, is omitted here. This completes the processing for recording a moving image with sound according to the embodiment.

Once the recording of a moving image is started, EVE through-image display, per step S14, and moving image and audio recording, that is, step S15 and S16 are No, are continually performed until the half stroke operation of the shutter button or the operation of the recording end button is detected.

Here, when the recording end button is operated, that is, step S16 is Yes, processing proceeds to step S17. If unwritten data remains in the output buffer of the DRAM 9, the DSP/CPU 1 completes, or flashes, the writing to the memory card 12. The DSP/CPU 1 also performs writing to the memory card 12 in relation to the offset values of frames generated in the DRAM 9. The DSP/CPU 1 then closes the file opened on the memory card 12. This completes the creation of a moving image file with sound. That is, processing for recording a moving image with sound according to the embodiment involves EVF through-image display, compression and encoding of frames and audio data at a prescribed frame rate, 30 fps according to the embodiment, and recording to the memory card 12 via an output buffer.

When generating a moving image file with sound, the audio data is filed or packetized after having been divided in a time axis direction by moving image frame units, or frame cycles, and synchronized with the frame images using the time information in the header of the moving image file. Furthermore, audio files may be generated separately to moving image files, and recorded in association with each other.

Processing then returns to step S1 again, where the DSP/CPU 1 prepares for the next recording start or shutter button operation.

A case in which the shutter button is operated while the DSP/CPU 1 is recording a moving image with sound is described next. This processing is performed in the case where FIG. 2, step S15 is judged in the affirmative.

Figure 4:
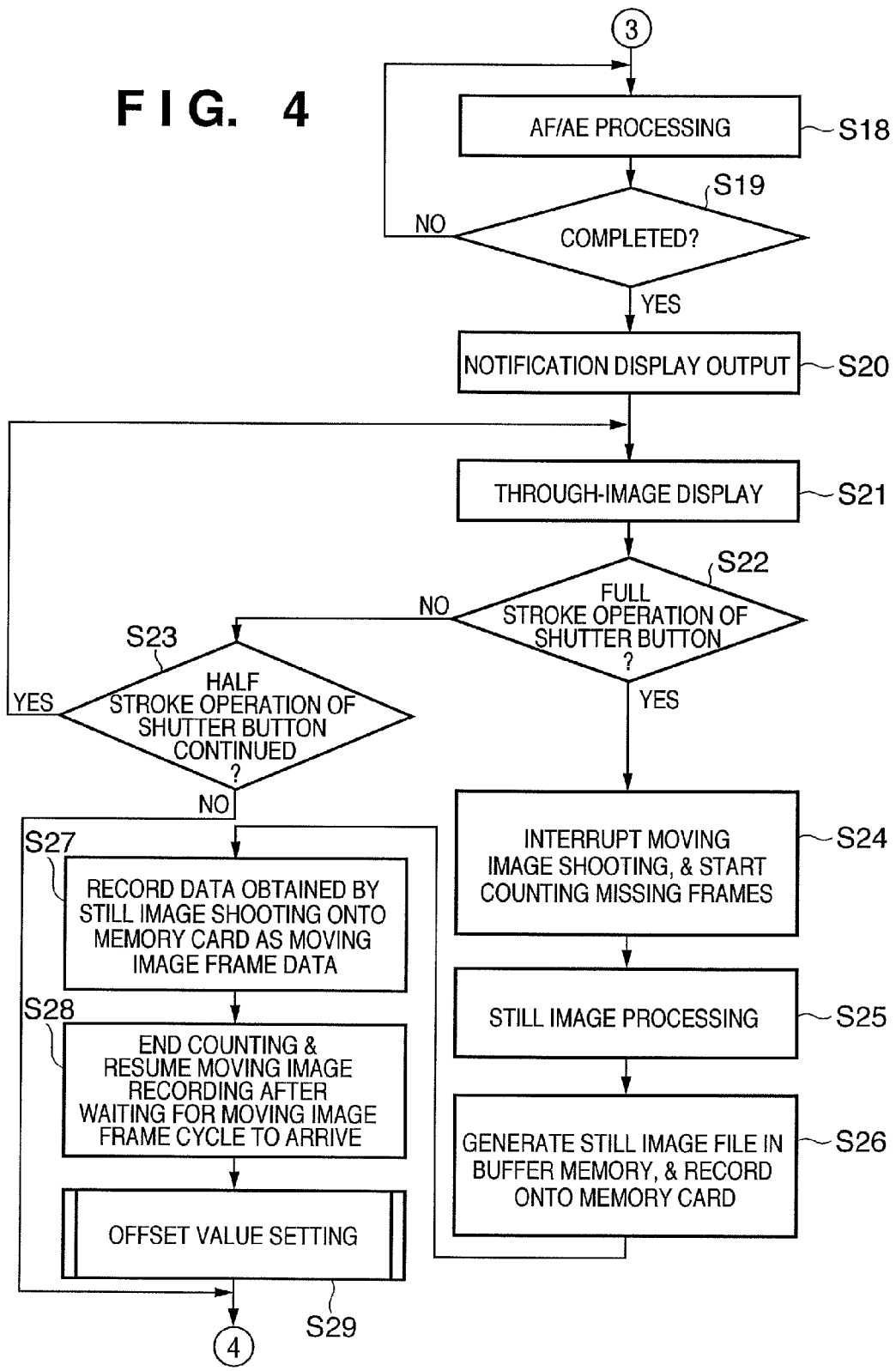
FIG. 4 is a flowchart showing a processing procedure of the digital camera according to the first embodiment.

Once the half stroke of the shutter button is detected while a moving image with sound is being recorded, processing proceeds to FIG. 4, step S18. Here, the DSP/CPU 1 executes AF and AE processing for still image shooting based on the image sensing signal output from the image sensing device 2, and sets the shooting conditions. When the shooting conditions have been set, that is, step S19 is Yes, the DSP/CPU 1 displays a notification showing that the setting is completed, or issues a prescribed sound, in step S20, starts the image sensing by the image sensing device 2 under the set conditions, and display an EVF through image, in step S21. Note that this notification processing need not be performed. Then, if a full stroke operation of the shutter button is detected, that is, step S22 is Yes, the DSP/CPU 1 interrupts the moving picture shooting, and starts processing for counting the number of moving image frames missed as a result of the still image processing, in step S24. The output of a pseudo shutter sound in step S10 of the normal still image recording described above is not performed.

At step S25, similarly to step S11 described above, the DSP/CPU 1 executes still image processing such as image-sensing by the image sensing device 2 of an object image for recording, and generating the image data of the object image, in step S25. The DSP/CPU 1 then generates a still image file, i.e., a file in JPEG format, etc., in the buffer memory based on image data constituted by the entire pixel data obtained by the image sensing device 2, and stores the generated still image file onto the memory card 12, in step S26. This ends the still image recording.

Processing proceeds then to step S27. Here, the DSP/CPU 1 generates image data of VGA size from the still image data image-sensed as a still image, and JPEG encodes the generated image data. The DSP/CPU 1 then records, i.e., appends, this JPEG encoded image data to the memory card 12 as a pseudo moving image frame to be additionally written to the file opened for saving a moving image.

Next, the DSP/CPU 1 resumes the moving image recording after waiting for the next moving image frame cycle to arrive, in step S28. This is to synchronize the resume timing of the moving image with 1/30 sec since the shooting frame rate of the moving image in the present embodiment is 30 fps.

Next, processing proceeds to step S29, where the DSP/CPU 1 sets offsets for however many frames were missed from when the moving image recording was interrupted until when it was resumed. This processing for adjusting offsets is detailed in the flowchart in FIG. 6.

According to the embodiment, frames created based on image data resulting from still image shooting are used for frames, that is, missing frames, that should originally have existed during the period from when moving image recording is interrupted until when it is resumed.

For this reason, "0" is firstly stored in variable i as an initialization value. Next, processing for setting the current offset value is repeated for as long as variable i is less than the number of frames missed as a result of the still image processing, in steps S31-S33. The offset value that is set is the offset value at the stage at which moving image recording was interrupted. Consequently, the offsets of the frames excluding the last of the missing frames ultimately point to the data of the frame generated from the still image data saved at step S27. When the variable i reaches the last missing frame, that is, step S33 is Yes, the DSP/CPU 1 sets a value that results from adding the encoded data volume of the frame obtained from the still image, in step S34. This value is for setting the offset address of the first frame after the moving image recording is resumed.

Figure 2:
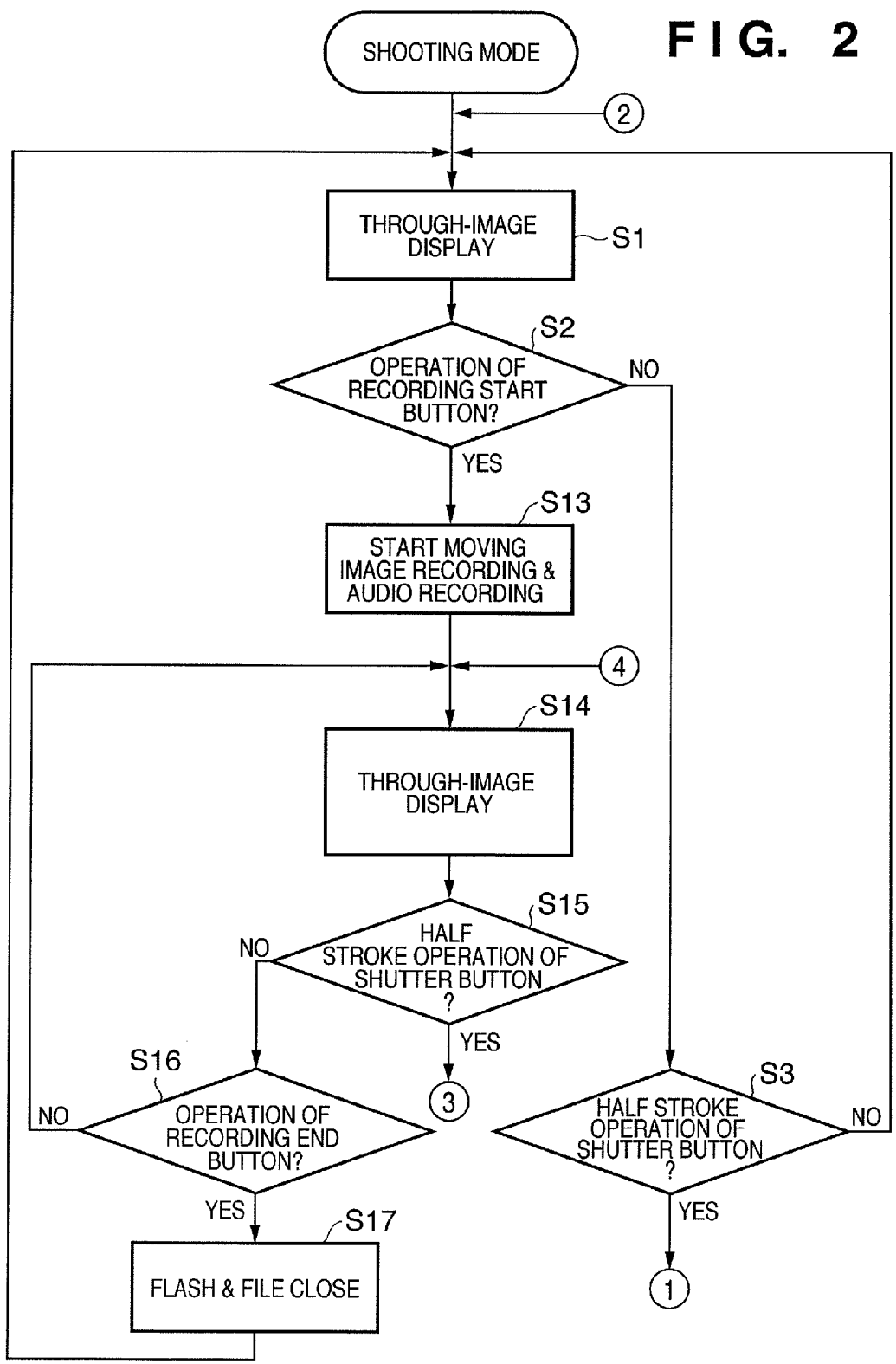
FIG. 2 is a flowchart showing a processing procedure of the digital camera according to a first embodiment.

Moving image recording is resumed in this way, and processing returns to FIG. 2, step S14.

The structure of the moving image file generated as a result of the above processing is shown in FIG. 11, for example. This figure shows a case where the time period from frames 4-6 was missed as a result of the still image recording. Since the offset address of the next frame 4 is determined when the recording of frame 3 is completed, the offset numbers deviate as shown in this figure. However, in relation to frames 4-6, the frame obtained as a result of the still image shooting, "moving image frame S" in this figure, is pointed to. Also, an address increased by the data volume of the frame obtained as a result of the still image shooting is set in relation to frame 7, which is the first frame after moving image recording is resumed.

According to the present embodiment, it is possible to record a still image during moving image recording. Also, only the one frame obtained as a result of the still image shooting is stored, making processing for storing a plurality of frames redundant. Consequently, it is also possible to reduce the load on the DSP/CPU 1 and the size of the generated moving image file in comparison to conventional technology.

Although the present invention is applied in an apparatus that shoots moving images with sound according to the embodiment, the present invention may also be applied in shooting moving images without sound.

Second Embodiment

According to the preceding embodiment, that is, first embodiment, processing for setting offset values, in step S29, is performed after the resumption of moving image processing, in step S28. If the time interval from the full stroke shutter operation until the completion of the still image shooting and the writing to the memory card 12 is fixed, that is, if the missing number of moving image frames is fixed, clocking time for calculating the number of missing frames can be made redundant.

In view of this, an example that addresses this point is described according to the second embodiment. The apparatus configuration according to the second embodiment is the same as the first embodiment, and the processing that replaces FIG. 4 is described below in accordance with the flowchart in FIG. 9. Attention is drawn to the fact that the flowchart in FIG. 9 is processing performed in the case where FIG. 2, step S15, is judged in the affirmative, that is, in the case where a half stroke operation of the shutter button is detected during moving image recording.

Figure 9:
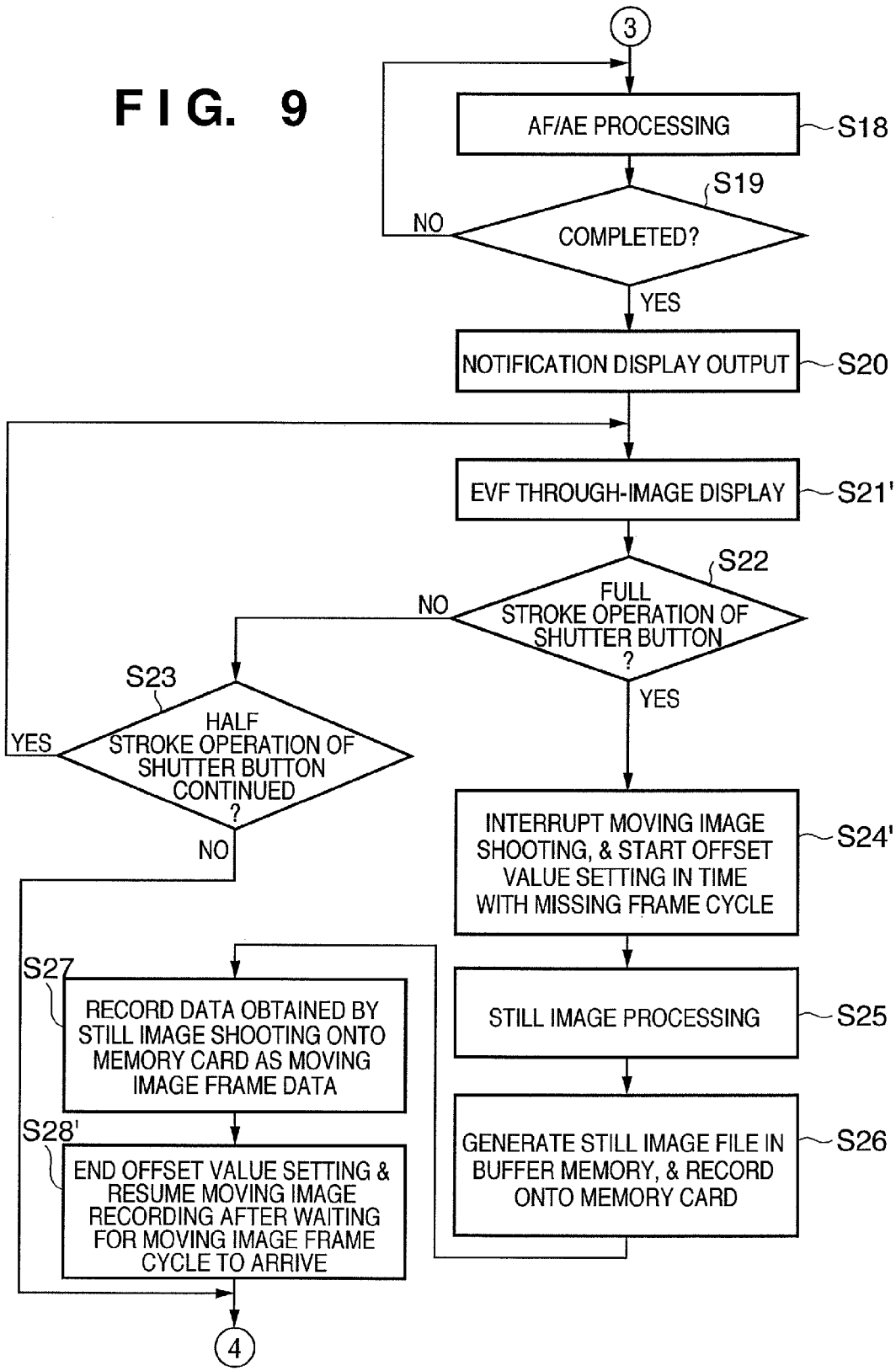
FIG. 9 is a flowchart showing a processing procedure of the digital camera according to a second embodiment.

The flowchart in FIG. 9 differs from FIG. 4 in that step S24' is provided in place of step S24, and step S28' is provided in place of step S28. Otherwise, FIG. 9 is identical to FIG. 4.

According to the second embodiment, the DSP/CPU 1, on detection of a full stroke shutter operation, starts processing in step S24' for storing offset values in time with the acquisition cycle of moving image frames, although moving image acquisition cannot actually be performed. The offset immediately preceding the full stroke shutter operation is stored as the offset value.

Next, still image recording is performed at steps S25 S27. The DSP/CPU 1 ends the processing for setting offsets for the moving image at step S28', and adds the size of the moving image frame data generated from the still image obtained at step S27 to the existing offset. The moving image recording is then resumed.

It is possible to achieve effects similar to those of the first embodiment as a result of processing such as the foregoing. Furthermore, because processing for counting the missing frames is made redundant, the load on the DSP/CPU 1 can also be reduced in comparison to the first embodiment.

Third Embodiment

The first and second embodiments were described in terms of using a still image for missing moving image frames resulting from a still image being shot during moving image recording. That is, the offsets of the missing frames point to a still image, albeit an image obtained after dropping the resolution.

In the example according to the third embodiment, missing frames, which result from moving image recording being interrupted when a still image is recorded during moving image recording, refer to the moving image frame immediately preceding the still image recording. In other words, the missing frames refer to the last moving image frame when a still image is shot during moving image recording.

Figure 5:
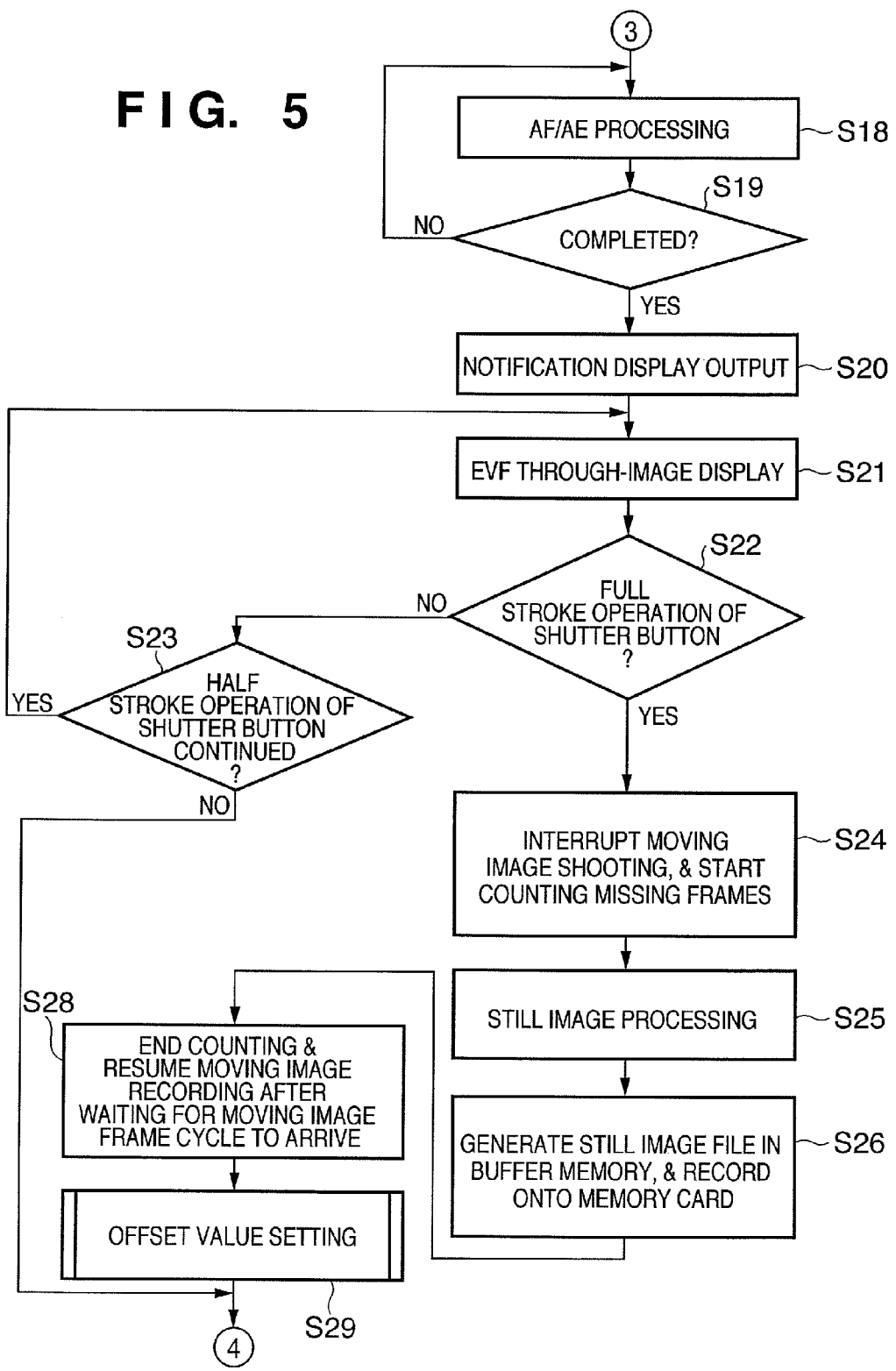
FIG. 5 is a flowchart showing a processing procedure of the digital camera according to a third embodiment.
Figure 6:
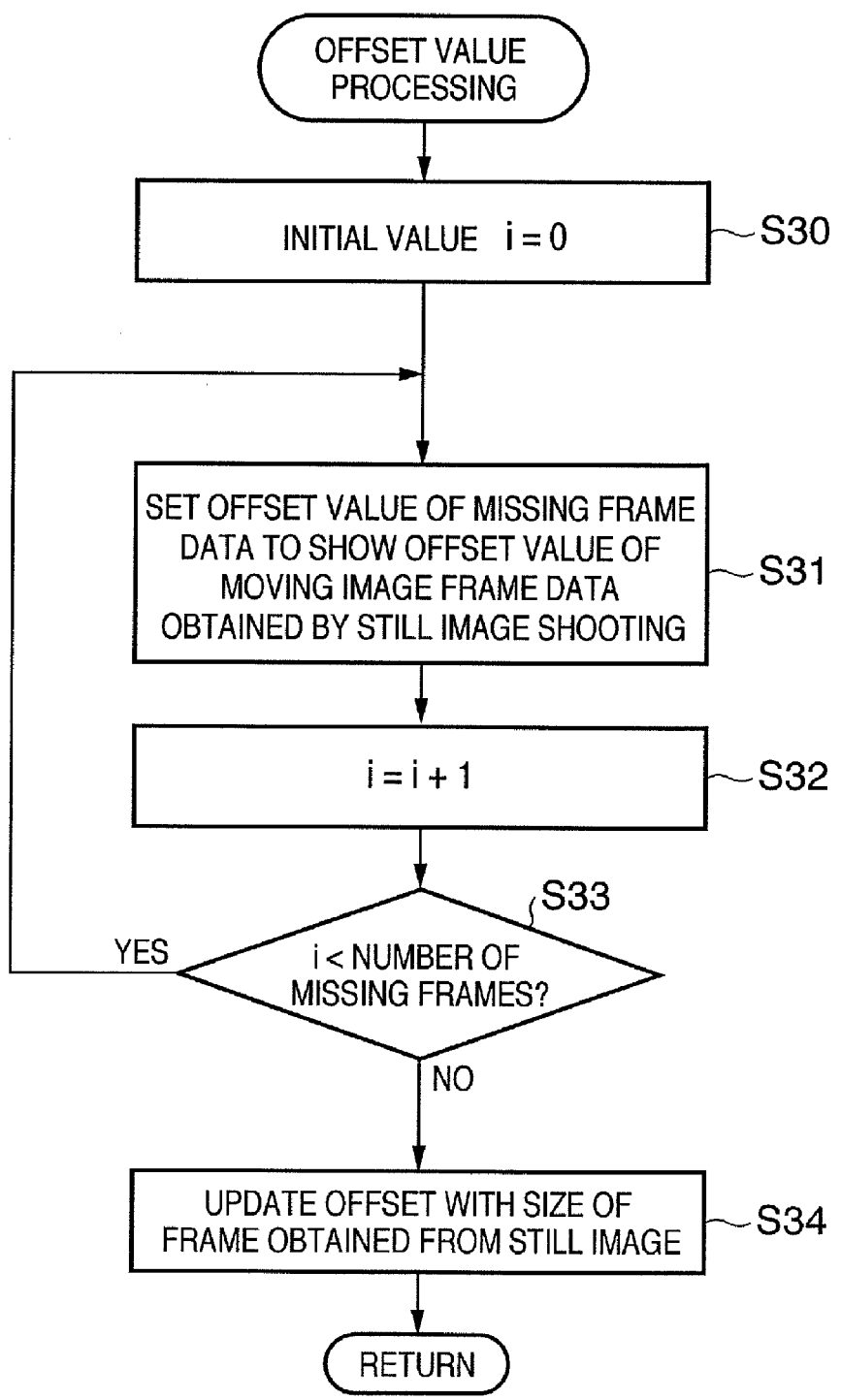
FIG. 6 is a flowchart showing processing for setting offset values according to the first embodiment.

Description of the apparatus configuration according to the third embodiment, being the same as the first embodiment, is omitted here. The processing that replaces FIG. 4 is described below in accordance with the flowchart in FIG. 5. The flowchart in FIG. 5 is processing performed in the case where FIG. 2, step S15, is judged in the affirmative, that is, in the case where a half stroke operation of the shutter button is detected during moving image recording. The same reference signs are attached to processing that is substantially the same as FIG. 4.

When the half stroke operation of the shutter button is detected during moving image recording with sound, processing proceeds to FIG. 5, step S18. Here, the DSP/CPU 1 executes AF and AE processing for still image shooting based on the image sensing signal output from the image sensing device 2, and sets the shooting conditions. When the shooting conditions have been set, that is, step S19 is Yes, the DSP/CPU 1 displays a notification showing that the setting is completed, or issues a prescribed sound, in step S20, starts the image sensing by the image sensing device 2 under the set conditions, and displays an EVF though image, in step S21. Note that this notification processing need not be performed.

Then, if a full stroke operation of the shutter button is detected, that is, step S22 is Yes, the DSP/CPU 1 interrupts the moving picture shooting, and starts processing for counting the number of moving image frames missed as a result of the still image processing, in step S24. At step S25, similar to step S11, the DSP/CPU 1 executes still image processing such as image-sensing by the image sensing device 2 of an object image for recording, and generating the image data of the object image, in step S25. The DSP/CPU 1 then generates a still image file, i.e., a file in JPEG format, etc., in the buffer memory based on image data constituted by the entire pixel data obtained by the image sensing device 2, and stores the generated still image file onto the memory card 12, in step S26. This ends the still image recording.

Figure 7:
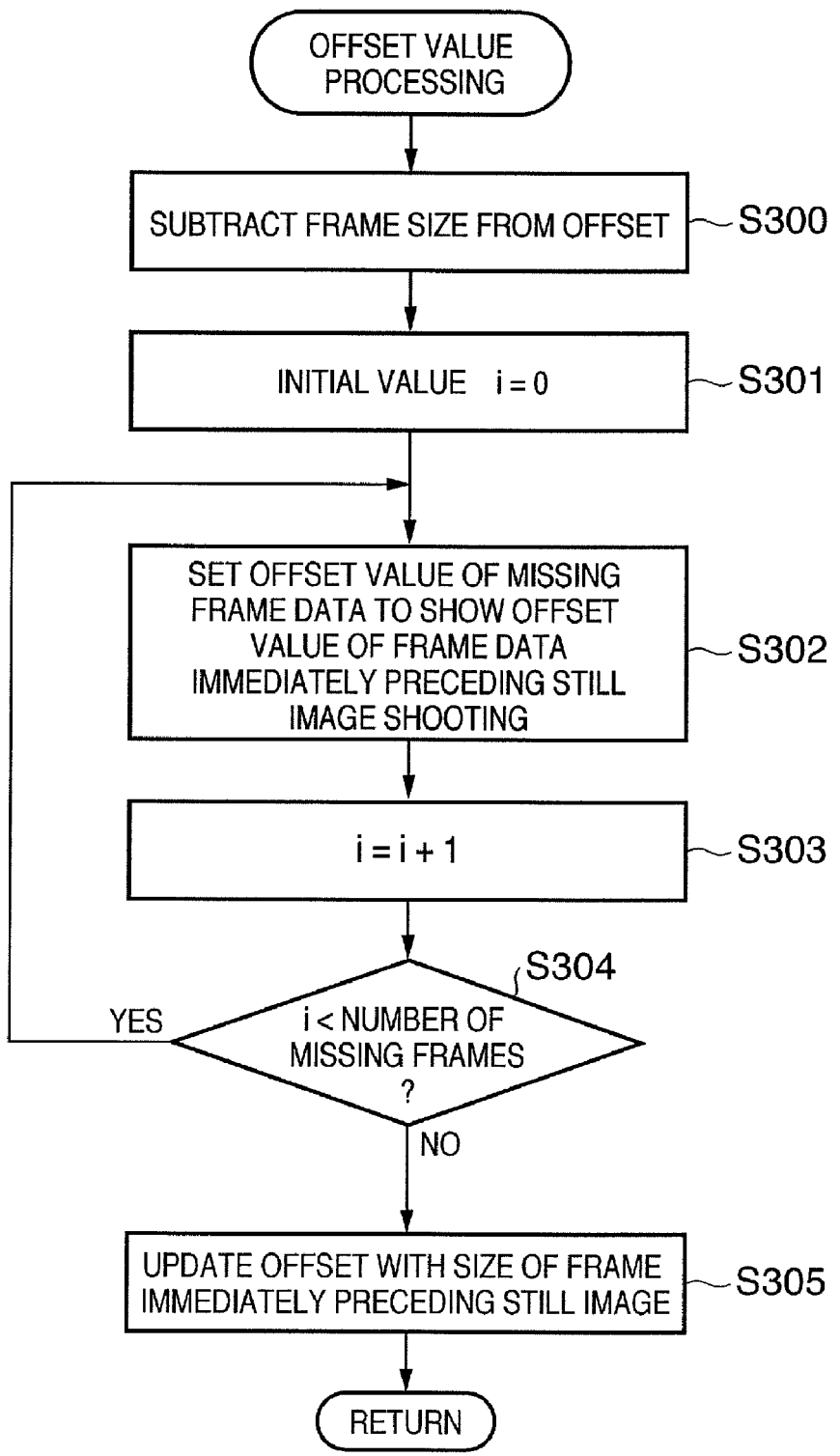
FIG. 7 is a flowchart showing processing for setting offset values according to the third embodiment.

The DSP/CPU 1 then resumes the moving image recording after waiting for the next moving image frame cycle to arrive, in step S28. Next, processing proceeds to step S29, where the DSP/CPU 1 sets the offsets of however many frames were missed during the period from when the moving image recording was interrupted until when it was resumed. The processing for setting offsets is detailed in the flowchart in FIG. 7.

According to the embodiment, frames that should originally have existed during the period from when the moving image recording was interrupted until when it was resumed, i.e., missing frames, point to the moving image frame immediately preceding the recording of the still image.

When recording a moving image, the size of a moving image frame image sensed at a given point in time is added to the offset so as to point to the storage location of the next moving image frame. For this reason, the offset value firstly needs to be reset to the offset immediately preceding the still image recording.

Therefore, in step S300, the DSP/CPU 1 firstly corrects the offset by subtracting the size of the moving image frame that was last obtained from the current offset value.

The DSP/CPU 1 then stores "0" in variable i as an initial value, in step S301. Next, processing for setting the current offset value is repeated for as long as the variable i is less than the number of frames missed as a result of the still image processing, in steps S302 to S304. The offset value that is set is the offset value obtained in step S300. Consequently, the offsets of frames excluding the last of the missing frames ultimately point to the data of the moving image frame immediately preceding the still image recording. When the variable i reaches the last missing frame, that is, step S304 is Yes, processing proceeds to step S305, where the DSP/CPU 1 prepares for the resumption of the moving image recording by adding the size of the frame subtracted in step S300.

Moving image recording is resumed in this way, and processing returns to FIG. 2, step S14.

According to the first and second embodiments, image data resulting from still image shooting is written to the memory card 12 as frames of moving image data when a still image is recorded during moving image recording. According to the third embodiment, missing frames are made to refer to the moving image frame immediately preceding the still image recording when a still image is recorded during moving image recording, and moving image frames are not generated and written for the missing frames. Consequently, it is possible to further reduce the load on the DSP/CPU 1.

A simple description of the above processing follows.

Figure 12:
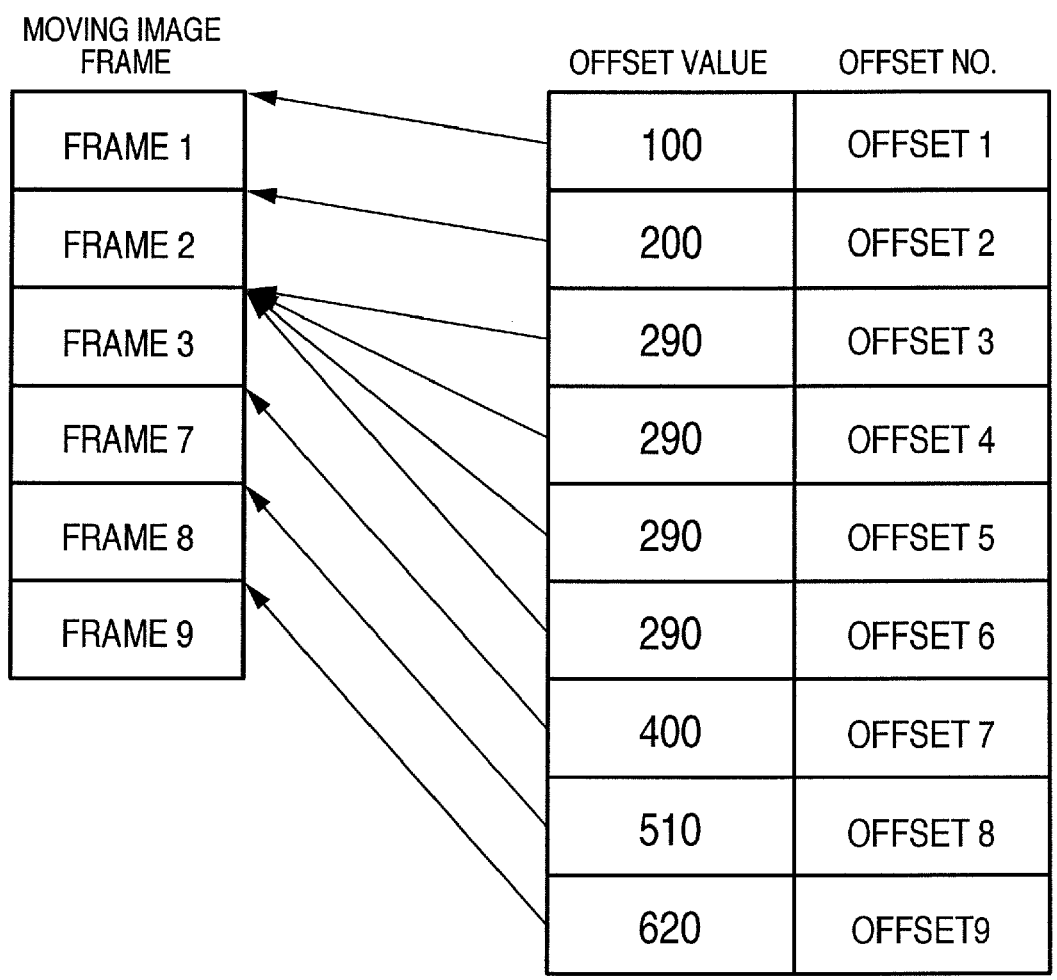
FIG. 12 shows an exemplary relation between offset values and moving image frames in a moving image file according to the third embodiment.

FIG. 12 shows an example in which three frames are missing as a result of moving image shooting being interrupted when still image shooting is performed at the point of moving image frame 4. All of offsets 4-6 are set to the offset value of offset 3 specifying the reference address of moving image frame 3, which is the frame immediately preceding the still image processing performed during moving image shooting.

In comparison to FIG. 11, a still image frame is not used for missing frames 4-6, enabling the size of the moving image file to be reduced by this amount.

Although the present invention is applied in an apparatus that shoots moving images with sound according to the third embodiment, the present invention may also be applied in shooting moving images without sound.

Also, according to the third embodiment, the processing for setting offset values, in FIG. 5, step S29, is performed after the moving image processing has been resumed, per step S28. However, processing similar to the second embodiment may be performed in cases such as where a full stroke shutter operation is performed, per step S22, and the location, i.e., offset value, of the moving image frame immediately preceding the still image processing has already been determined. That is, the DSP/CPU 1 may start setting the offset value of the frame data immediately preceding the still image processing in sync with the missing frame cycle, in step S24', prior to starting the still image processing as shown in FIG. 9, step S25.

Further, the processing for setting offset values, in FIG. 5, step S29, may be performed after the end of the moving image shooting, given that it is also possible to set offset values based on the size of frame data. Since it is sufficient if offset values are set before creating the moving image file, the processing for setting offset values, per step S29, may be performed at any time during or at the end of the moving image shooting.

Fourth Embodiment

A fourth embodiment is described next. Frame data immediately preceding the interruption of the moving image shooting is used according to the third embodiment for setting the offset value. According to the fourth embodiment, the offset value of an arbitrary moving image frame prepared in advance, a Motion JPEG moving image frame N, for instance, is specified. Description is thus given using only the flowchart in FIG. 8 that shows the processing for setting offset values.

According to the fourth embodiment, the DSP/CPU 1 stores an arbitrary moving image frame prepared in advance into a moving image file, generates an index obtained by the following processing for setting offset values, and stores the generated index onto the memory card 12.

In the index are recorded offset values and data sizes for referencing data such as audio and moving image frames.

Figure 8:
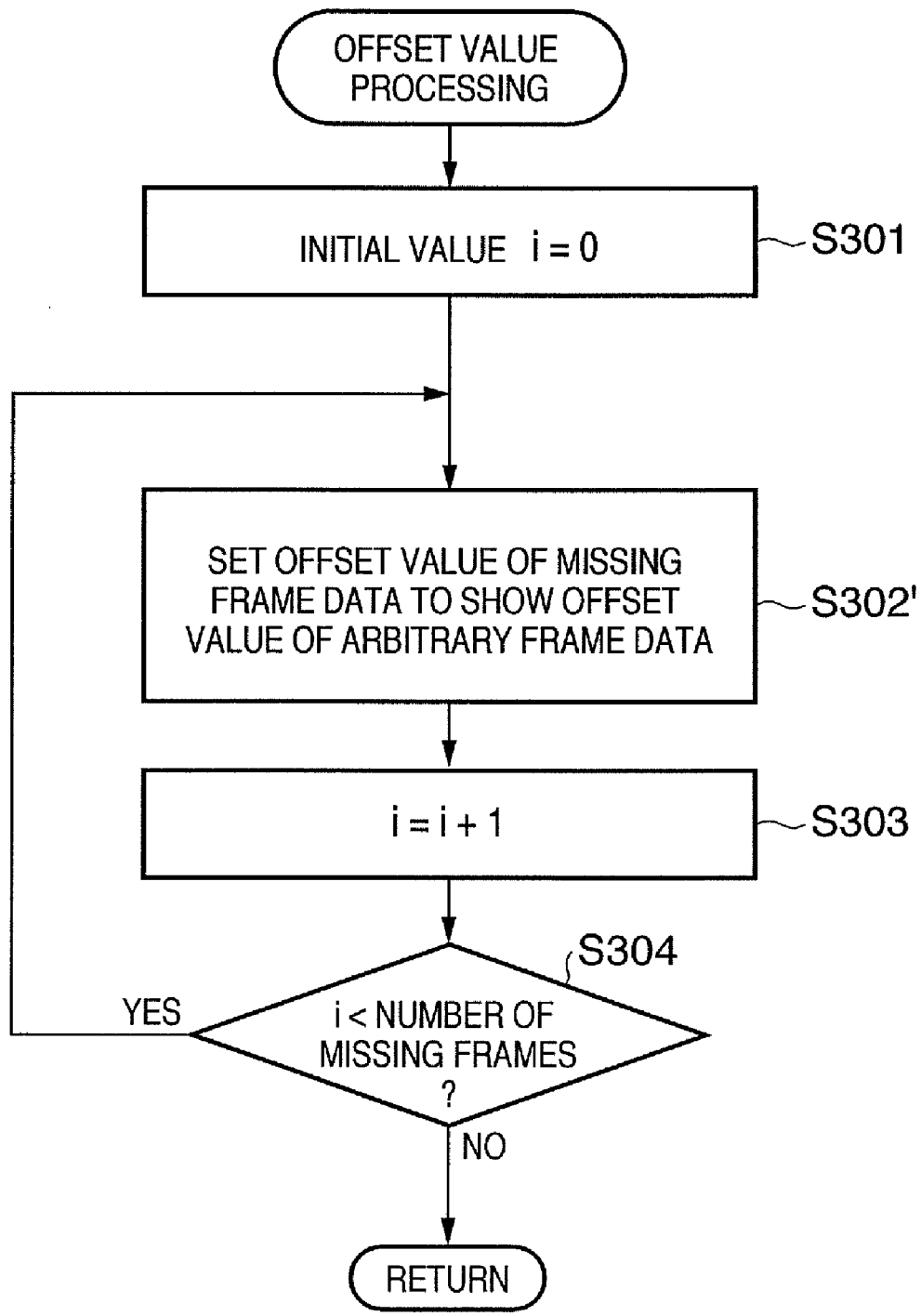
FIG. 8 is a flowchart showing processing for setting offset values according to a fourth embodiment.

The processing in FIG. 8 for setting offset values creates an index showing the offset value of moving image frame N.

Firstly, the DSP/CPU 1 sets variable i=0 as an initial value for repeatedly setting an offset value for however many missing frames resulting from the still image processing have been counted up to that point, in step S301. The DSP/CPU 1 then sets a value showing a fixed offset of the missing frame data, in step S302'. The DSP/CPU 1 increments the variable i in order to repeatedly perform the setting for the number of missing moving image frames, per step S303. The DSP/CPU 1 repeats this processing until it is judged that the variable i has been incremented for the number of missing moving image frames, for as long as step S304 is No. Note that because this processing for setting offset values specifies an offset value of moving image frame N, the setting may be performed after the end of the recording.

The processing then returns to FIG. 2, step S14, where the DSP/CPU 1 continues performing EVF through-image display, moving image recording, and audio recording, that is, steps S15 and S16 are both No. When the recording end button is operated, that is, step S16 is Yes, the DSP/CPU 1 writes any unwritten data stored in the write buffer to the memory card 12, and writes the above offsets stored in buffer memory to the memory card 12, per step S17.

This ends the moving image shooting for the time being and processing returns to step S1, where similar operations are performed until the shooting mode is released.

According to the embodiment, frame data does not need to be recorded during the time period in which the operation for image sensing moving image frames is interrupted by still image processing, thereby cutting the file size and also reducing the writing load to the memory card 12.

Although the present invention is applied in an apparatus that shoots moving images with sound according to the fourth embodiment, the present invention may also be applied in shooting moving images without sound.

Also, according to the present embodiment, processing for setting offset values is performed after the resumption of moving image processing. However, the DSP/CPU 1 may perform processing such as that shown in FIG. 9 of the second embodiment in a case where the location, or offset value, of moving image frame N has already been determined when the full stroke shutter operation is performed. That is, the DSP/CPU 1 may start setting the offset value of moving image frame N in sync with the cycle of missing frames, per step S24', before starting the still image processing, per step S25.

Further, in the processing for setting offset values, per step S28', an arbitrary offset value may be set after the end of the moving image shooting, given that it is also possible to set offset values based on the size of frame data. Since it is sufficient if offset values are set before creating the moving image file, the processing for setting offset values, per step S28', may be performed at any time during or at the end of the moving image shooting.

Figure 13:
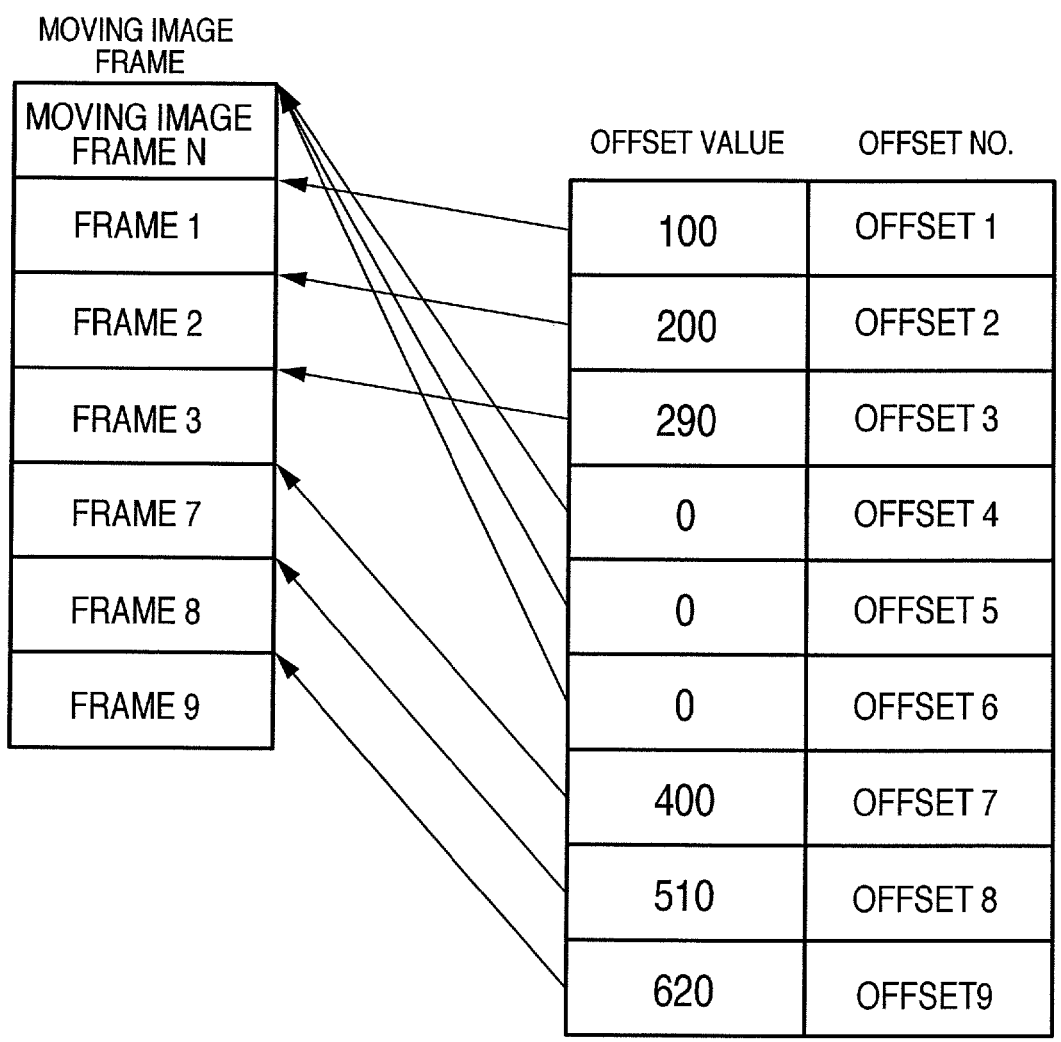
FIG. 13 shows an exemplary relation between offset values and moving image frames in a moving image file according to the fourth embodiment.

The relation between values, that is, offset values, and moving image frames for referencing frame data on the moving image file according to the fourth embodiment are shown in FIG. 13. This figure shows three frames missing due to moving image shooting being interrupted when still image shooting was performed at the point of moving image frame 4 in FIG. 10 during moving image shooting. The DSP/CPU 1 sets offsets 4-6 to the offset value of the offset 0 specifying the reference address of moving image frame N prepared in advance, e.g., a moving image frame inserted at the top 0 of the moving image file. As a result, offsets 5 and 6 refer to the same data as moving image frame 4, making the frame data of moving image frames 4-6 redundant. Since only the frame data of moving image frame N and frames 1-3 and 7-9 is recorded onto the memory card 12, as shown in FIG. 13, frame data during the interruption of the moving image shooting can be cut back, thereby eliminating the writing load to the memory card 12.

Fifth Embodiment

A fifth embodiment is described next. The fifth embodiment is described in relation to a method for generating moving image files in which moving image frames and audio data are interleaved when shooting a still image during moving image shooting.

According to the fifth embodiment, audio data and moving image frames are interleaved in editing units in generated moving image files. With the conventional example in FIG. 17A, for example, 1 second of audio data is interleaved every 5 moving image frames in a moving image file, given an editing unit of 1 second with a 5 fps moving image. In other words, sets of one piece of audio data and five moving image frames are stored in a moving image file. According to the fifth embodiment and a sixth embodiment described below shown in FIGS. 17B and 17C, audio data and moving image data are also interleaved in moving image files based on an editing unit of 1 second. Note that the example described here includes one piece of audio data and five moving image frames, based on an editing unit of 1 second. These figures are to simplify description, however, and the present invention is not limited by these figures.

According to the fifth embodiment, the offset number of each piece of audio data is set as the initial number of the editing units. To judge whether an offset number is the initial number of an editing unit, the DSP/CPU 1 counts the offset numbers of the audio data and the moving image frames from the start to the end of moving image shooting.

Figure 18B:
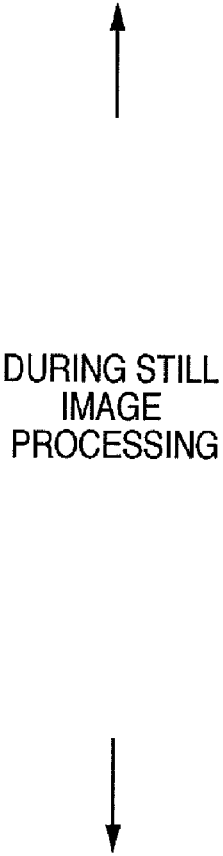
FIGS. 18B and 18C show exemplary moving image file indexes according to the fifth and sixth embodiments.
Figure 18C:
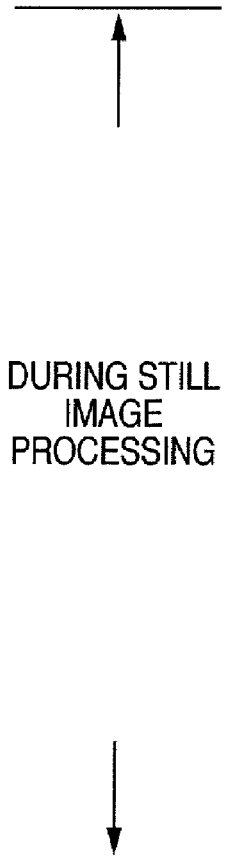

FIGS. 18A, 18B, and 18C represent indexes showing offset values and data sizes for referencing the moving image frames and audio data according to the conventional example, the fifth embodiment, and the sixth embodiment, respectively.

With a 5 fps moving image, the offset number of the initial piece of audio data is set to 1, and the offset number of the first moving image frame is set to 2. Consequently, the offset number of the second piece of audio data is 1+6=7. That is, for audio data, the initial offset number of the editing units is 6N+1 (N=0, 1, 2 . . . ).

Figure 14:
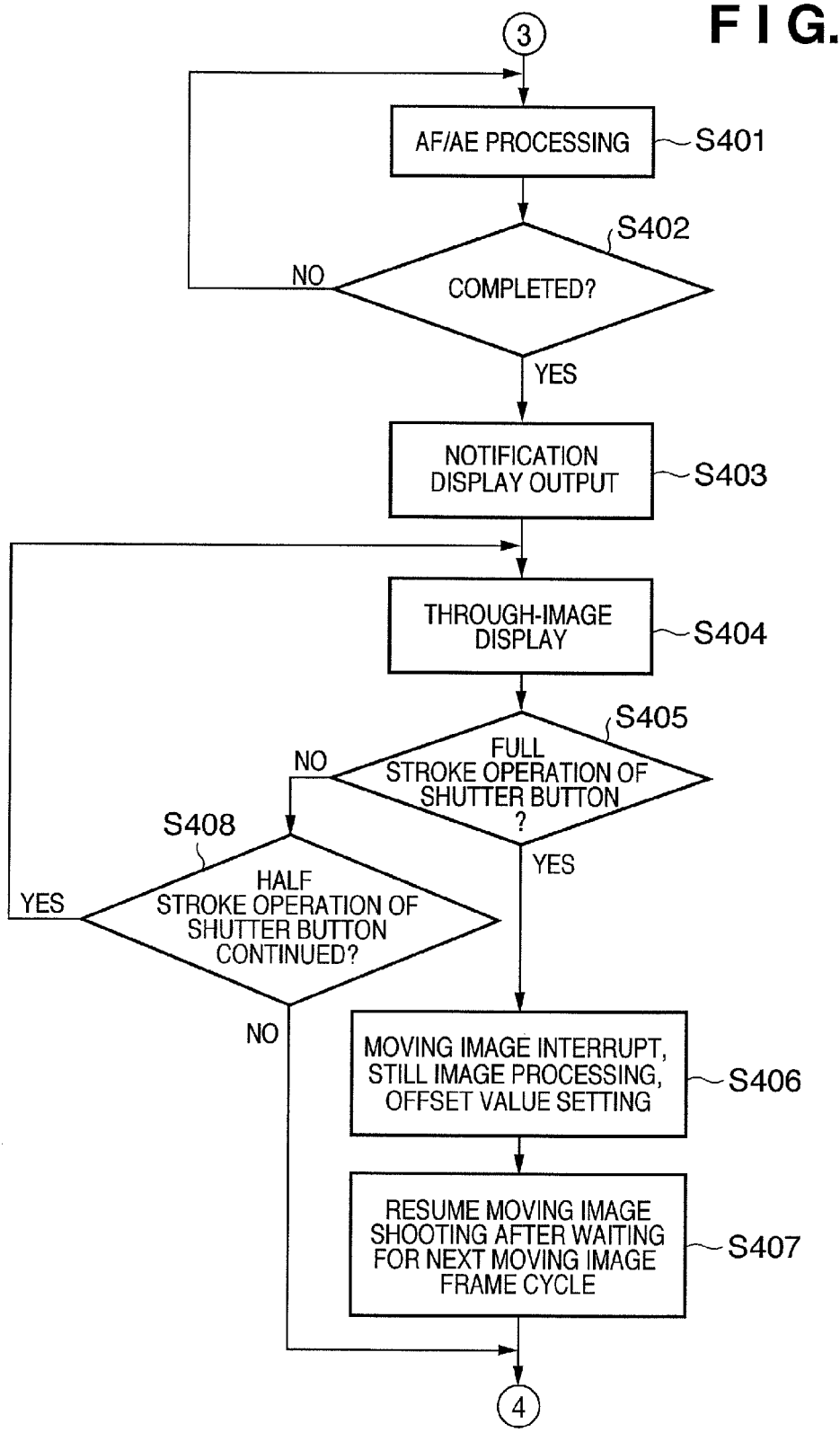
FIG. 14 is a flowchart showing a processing procedure of the digital camera according to a fifth embodiment.

The fifth embodiment is described using the flowchart in FIG. 14. The processing in FIG. 14 replaces FIG. 4 according to the first embodiment. In other words, the flowchart of FIG. 14 is processing performed in the case where FIG. 2, step S15, is judged in the affirmative, that is, in the case where a half stroke operation of the shutter button is detected during moving image recording.

When a half stroke operation of the shutter button is detected during moving image recording with sound, processing proceeds to FIG. 14, step S401. Here, the DSP/CPU 1 executes AF and AE processing for still image shooting based on the image sensing signal output from the image sensing device 2, and sets the shooting conditions. When the shooting conditions have been set, that is, step S402 is Yes, the DSP/CPU 1 displays a notification showing that the setting is completed, or issues a prescribed sound, per step S403. The DSP/CPU 1 then starts the image sensing by the image sensing device 2 under the set conditions, and display an EVF through image, in step S404. Note that this notification processing need not be performed. Then, if a full stroke operation of the shutter button is detected, that is, step S405 is Yes, the DSP/CPU 1 interrupts the moving picture shooting, and starts the still image processing and the processing for setting offset values, in step S406. Audio input and processing for storing audio data is however continued. Note that the output of a pseudo shutter sound in step S10 of the normal still image recording described above may or may not be performed at this time.

In the still image shooting in step S406, the DSP/CPU 1 executes still image processing such as image-sensing by the image sensing device 2 of an object image for recording, and generating the image data of the object image, similar to step S11. The DSP/CPU 1 then generates a still image file, i.e., a file in JPEG format, etc., in the buffer memory based on image data constituted by the entire pixel data obtained by the image sensing device 2, and records the generated still image file onto the memory card 12. This ends the still image recording.

Figure 15:
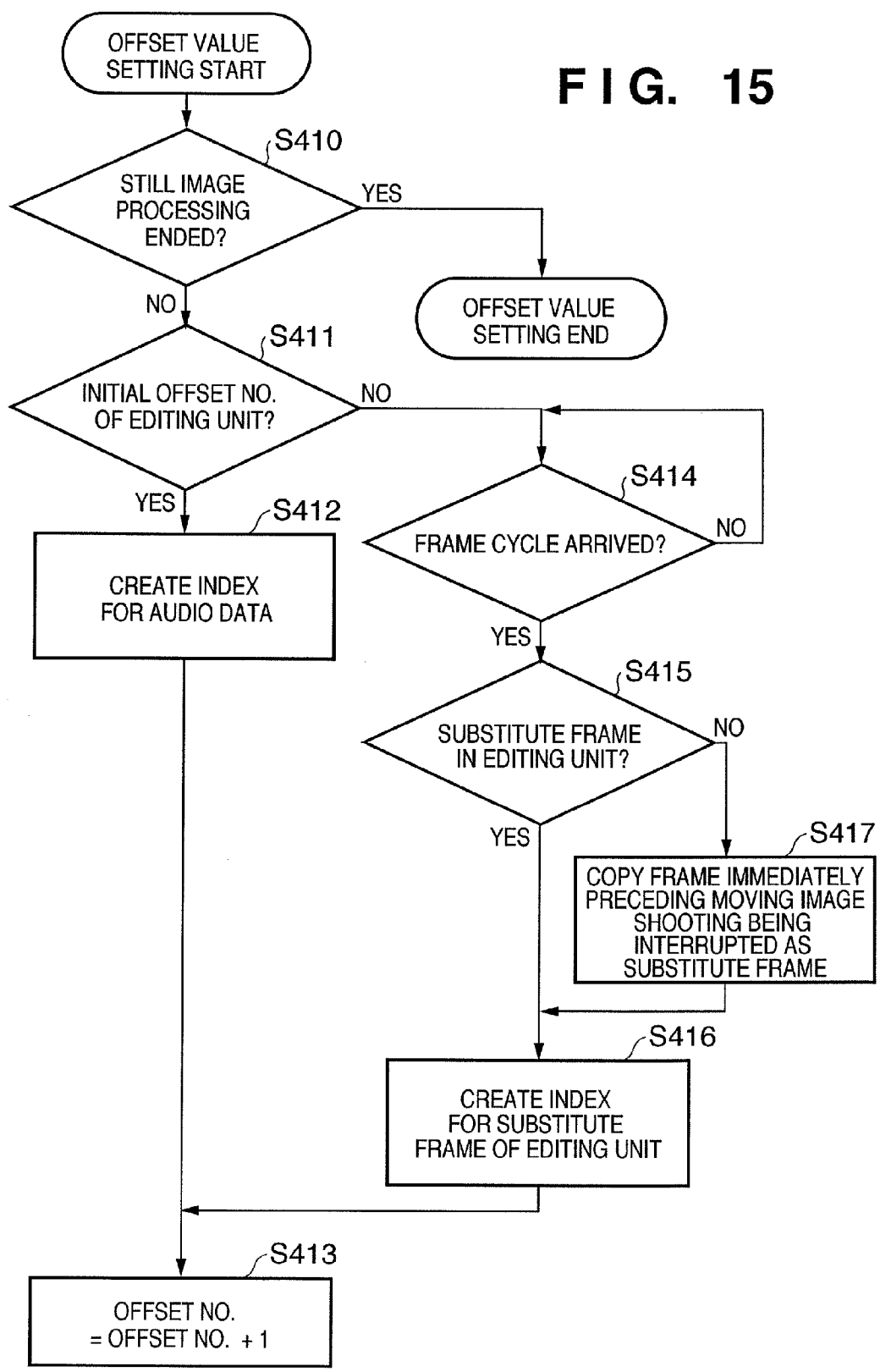
FIG. 15 is a flowchart showing a processing procedure of the digital camera according to the fifth embodiment.

The processing for setting offset values in step S406 is described in further detail in accordance with the flowchart in FIG. 15.

Firstly, in step S410, the DSP/CPU 1 judges whether the still image processing has ended. If it is judged to have ended, the DSP/CPU 1 ends the processing for setting offset values, and, in FIG. 14, step S407, resumes the moving image shooting after waiting for the next moving image frame cycle to arrive.

If it is judged in step S410 that the still image processing is incomplete, processing proceeds to step S411, where the DSP/CPU 1 judges whether the offset number of data to be generated is the initial number of the editing unit, during the time period in which the moving image recording is interrupted because of the still image shooting. In other words, the DSP/CPU 1 judges whether the offset number to be generated is "6N+1".

If the judgment result of step S411 is Yes, the DSP/CPU 1 adds the audio data size to the current offset value, and creates an index showing the offset value and data size for referencing the audio data, in step S412. This results in a buffer area for audio data being secured.

Next, in step S413, the DSP/CPU 1 adds "1" to the current offset number, and returns to the processing in step S410 for judging whether the still image processing has ended.

If the offset of data to be generated is judged in step S411 to be other than "6N+1", that is, a moving image frame, processing proceeds to step S414, where the DSP/CPU 1 waits for the next moving image frame cycle to arrive. If it is judged that the timing for generating the moving image frame has arrived, the DSP/CPU 1 judges in step S415 whether there is a substitute frame in the editing unit. If the offset is 6N+2, the DSP/CPU 1 judges that there is no substitute frame because it is the initial moving image frame in the editing unit, and processing proceeds to step S417, where the DSP/CPU 1 stores the encoded moving image frame data immediately preceding the moving image recording being interrupted into the output buffer memory as a substitute frame.

If it is judged in step S415 that the offset at the timing for generating the moving image frame is other than 6N+2, or if it is judged that the processing of step S417 has ended, processing proceeds to step S416. When processing proceeds to step S416, the DSP/CPU 1 creates an index showing the offset value and data size for referencing the substitute frame since the substitute frame has already been stored in the output buffer.

The processing then proceeds to step S413, where the DSP/CPU 1 increments the current offset number by 1, and returns to the judgment of whether the still image processing has ended.

Note that if there is no full stroke operation of the shutter button FIG. 14, step S405, that is, step S405 is No, and the half stroke operation of the shutter button is continued, that is, step S408 is Yes, processing returns to step S404, where the DSP/CPU 1 performs EVF through-image display.

If the half stroke operation of the shutter button is not continued, that is, step S408 is No, processing returns to FIG. 2, step S14. As a result, the DSP/CPU 1 continues the EVF through-image display, the moving image recording, and the audio recording, until the recording end button is operated, that is, steps S15 and S16 are both No. Then, if the recording end button is operated, that is, step S16 is Yes, the DSP/CPU 1 writes any unwritten data stored in the write buffer to the memory card 12. The DSP/CPU 1 also writes the above index accumulated in the buffer memory to the memory card 12 at this time, per step S17.

This ends the moving image shooting for the time being and processing returns to step S1, where similar operations are repeated until the shooting mode is released.

Note that pieces of audio data may be recorded as needed, with the data area secured in step S412 as an audio buffer.

As a result of the foregoing, if the shooting of a still image is instructed during moving image recording, moving image recording is interrupted for a time period from the start of still image shooting until the writing of still image data to the memory card 12 is completed. The relation between offset numbers and offset values during this time period is shown in FIG. 18B.

As shown in this figure, with an editing unit of one piece of audio data and five moving image frames, only one piece of audio data and one moving image frame is substantively generated, and the offset values can be set so that five moving image frames refer to one common moving image frame.

Although processing for setting offset values is performed in parallel with still image processing according to the fifth embodiment, missing frames may be counted during the still image processing, and the processing for setting offset values may be performed after the end of the still image processing, based on the counted number of missing frames.

According to the fifth embodiment, the recording of frame data during the time period in which still image processing is performed due to an interrupt and the shooting of moving image frames is interrupted is greatly reduced in comparison to the conventional technique, as shown in FIG. 17B. Furthermore, the file size is reduced and the writing load to the memory card 12 is also reduced.

In FIG. 17B, frames 4 and 5 actually exist after moving image frame 3. This means that when frames 4 and 5 are played, frame 3 is played as is. Consequently, nothing is illustrated in FIG. 17B in relation to frames 4 and 5.

Sixth Embodiment

The sixth embodiment is described next. The fifth embodiment was described in relation to a method for generating a moving image file in which moving image frames and audio data are interleaved when shooting a still image during moving image shooting. In contrast, the sixth embodiment is described in relation to a method for generating a moving image file that includes blackout frames and the pseudo moving image frames disclosed above, in order to keep a realistic feel when shooting a still image during moving image shooting.

A blackout frame is the frame of a black image that replicates the state of the image sensing device 2 when the shutter clicks. This blackout frame is stored in a nonvolatile memory as pre-encoded data.

The sixth embodiment differs from the fifth embodiment with respect to the processing at step S406 for setting offset values. Description of the rest, being the same as the fifth embodiment, is omitted.

To simplify the description, an editing unit in the sixth embodiment is also assumed to be configured by one piece of audio data and five moving image frames.

Figure 16A:
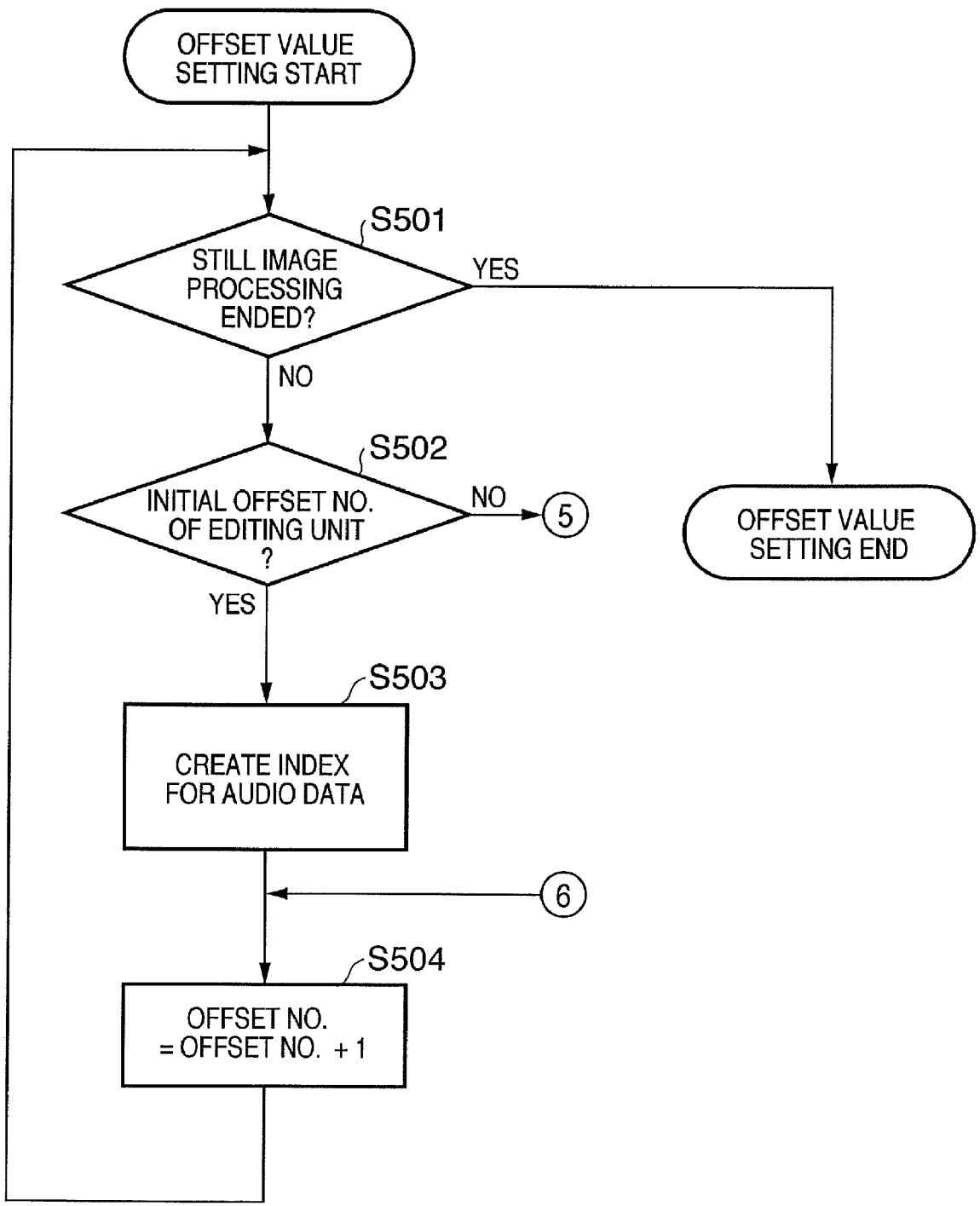
FIGS. 16A and 16B are flowcharts showing a processing procedure of the digital camera according to a sixth embodiment.
Figure 16B:
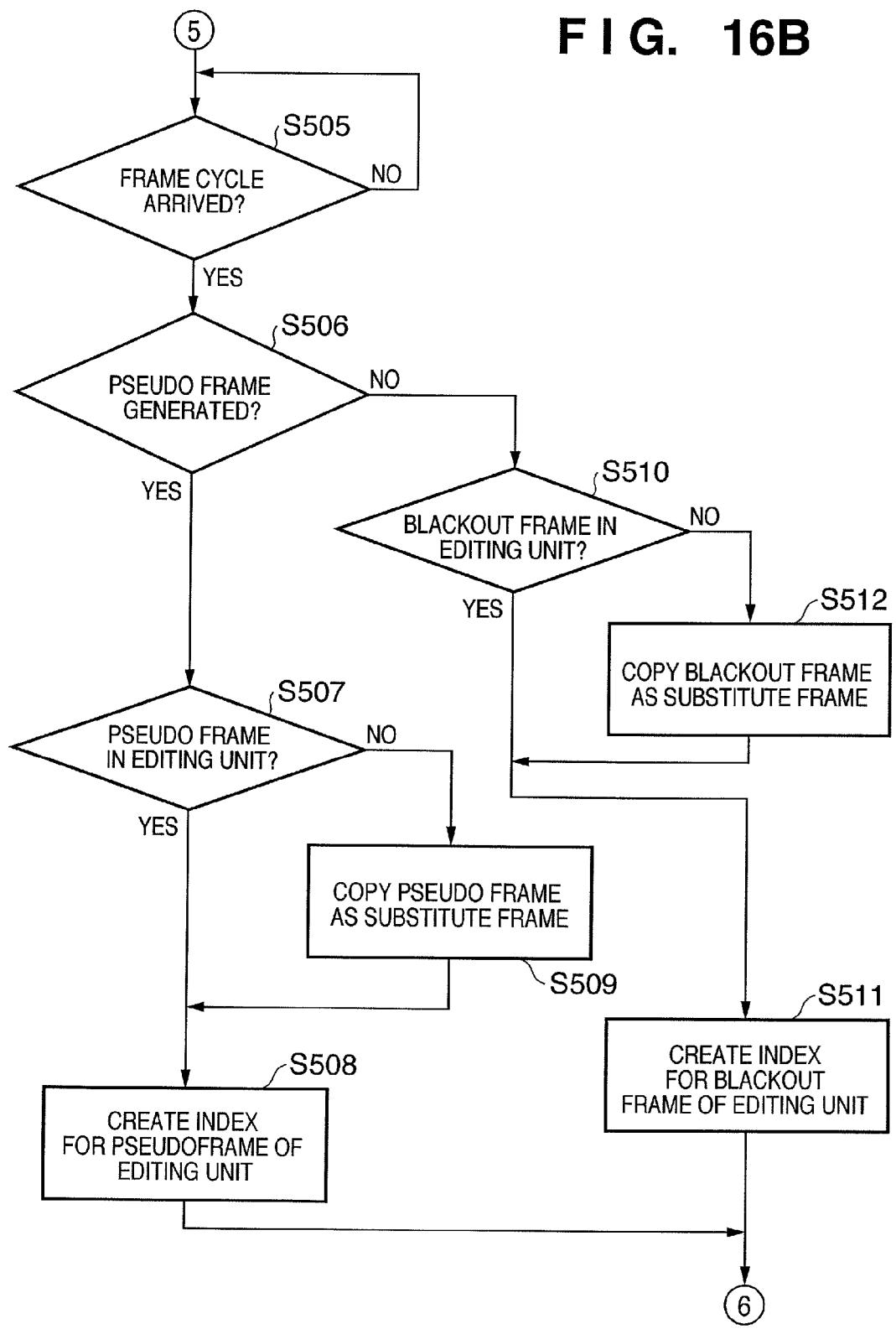

The processing for setting offset values at step S406 in the sixth embodiment is described in detail in accordance with FIGS. 16A and 16B.

Firstly, in step S501, the DSP/CPU 1 judges whether the still image processing has ended, that is, whether storage to the memory card 12 as a still image file is completed. If it is judged to have ended, the DSP/CPU 1 ends the processing for setting offset values, and in FIG. 14, step S407 resumes the moving image shooting after waiting for the next moving image frame cycle to arrive.

If it is judged in step S501 that the still image processing is incomplete, processing proceeds to step S502, where the DSP/CPU 1 judges whether the offset number of data to be generated is the initial number of the editing unit, during the time period in which the moving image recording is interrupted because of the still image shooting. In other words, the DSP/CPU 1 judges whether the offset number to be generated is "6N+1".

If the judgment result in step S502 is Yes, the DSP/CPU 1 adds the audio data size to the current offset value, and generates an index showing the offset value and data size for referencing the audio data, per step S503. This results in a buffer area for audio data being secured.

Next, in step S504, the DSP/CPU 1 increments the current offset number by 1, and returns to the processing in step S501 for judging whether the still image processing has ended.

If the offset of data to be generated is judged in step S502 to be other than "6N+1", that is, a moving image frame, processing proceeds to step S505, where the DSP/CPU 1 waits for the next moving image frame cycle to arrive.

If it is judged that the timing for generating the moving image frame has arrived, the DSP/CPU 1 judges in step S506 whether a pseudo frame for inserting in the editing unit has been generated. More specifically, the DSP/CPU 1 judges whether a VGA class image has been generated by thinning still image data obtained as a result of the still image shooting, and whether the thinned image data has been encoded. This is carried out prior to the still image file being stored onto the memory card 12.

If it is judged in the negative in step S506, processing proceeds to step S510, where the DSP/CPU 1 judges whether there is a blackout frame in the editing unit. If it is judged in the negative, processing proceeds to step S512, where the DSP/CPU 1 copies a blackout frame to the output buffer as a substitute frame. If it is judged that a blackout frame already exists in the editing unit in step S510, or if a blackout frame has been generated in step S512, processing proceeds to step S511. In step S511, the DSP/CPU 1 sets the offset value of the current moving image frame so as to refer to the generated blackout frame.

For example, if moving image shooting is interrupted as a result of still image shooting being started immediately after "frame 3", shown in FIG. 17C, the editing unit focused on is audio 1 and moving image frames 1-3, while the remaining two moving image frames 4 and 5 are lacking. A blackout frame does not exist in the editing unit focused on. One blackout frame is therefore inserted as a substitute frame equating to moving image frame 4. The DSP/CPU 1 sets the offset value so as to refer to the blackout frame, i.e., moving image frame 4, when the following moving image frame 5 is inserted. As a result, a blackout frame is inserted immediately before "audio 2" in FIG. 17C.

Once an index equating to moving image frame 5 has been created, processing proceeds to step S504, and the offset number is incremented by one. As a result, the offset number becomes 6N+1 and the next editing unit is focused on, meaning that the processing in step S503 described earlier is performed. The offset number then becomes 6N+2 as a result of being incremented by one at step S504.

Consequently, when the offset number is 6N+2, processing proceeds to step S510 if it is also judged in step S506 that a pseudo frame has not been generated. Because a blackout frame does not exist in the editing unit focused on in this case, the DSP/CPU 1 copies a blackout frame to the output buffer at step S512. As a result, a blackout frame is inserted immediately after "audio 2" in FIG. 17C. When the offset number is 6N+3, the judgment in step S510 will be affirmative if it is judged that a pseudo frame has not been generated. Consequently, in this case, the DSP/CPU 1 does not copy a blackout frame to the output buffer, but sets an offset index value at step S511 pointing to the blackout frame that has already been copied.

Once a pseudo frame has been generated from the still image obtained as a result of the still image shooting while a blackout frame or a frame referencing the blackout frame is being generated together with an offset index, the judgment in step S506 will be affirmative. As a result, processing proceeds to step S507, where the DSP/CPU 1 judges whether there is a pseudo frame in the editing unit. If it is judged that a pseudo frame does not exist, processing proceeds to step S509, where the DSP/CPU 1 stores a pseudo frame into the output buffer as a substitute frame. As a result, a pseudo frame is inserted at offset "540", as shown in FIG. 17C. The DSP/CPU 1 then creates an index showing the offset value and data size for referencing the substitute frame recorded in the output buffer, per step S508.

Note that once a pseudo frame has been inserted in the editing unit focused on, an offset index is generated for the remaining moving image frames so as to point to this pseudo frame.

Also, pieces of audio data may be recorded as needed, with the data area secured as an audio buffer in step S503.

Although processing for setting offset values is performed in parallel with still image processing according to the sixth embodiment, missing frames may be counted during the still image processing, and the processing for setting offset values may be performed after the end of the still image processing, based on the counted number of missing frames.

Also, according to the present embodiment, blackout frames are used as substitute frames until a pseudo moving image frame is generated. However, a pseudo moving image frame as disclosed above may be used as a substitute frame for missing frames when moving image shooting is interrupted, or an arbitrary moving image frame may be used, without using a blackout frame.

According to the sixth embodiment, the load on the CPU related to the recording of frame data during a time period in which the shooting of a moving image frame is interrupted by still image processing resulting from an interrupt is greatly reduced in comparison to the conventional technique, as shown in FIG. 17C. Furthermore, it is possible to reduce the file size and also reduce the load on the memory card resulting from writing to the memory card 12. Also, by inserting images of blackout frames, a realistic feel can be obtained when shooting a still image during moving image shooting.

According to the first through the sixth embodiments, the DSP/CPU 1 executes AF and AE processing when a half stroke operation of the shutter button is performed during moving image shooting, and executes still image processing resulting from an interrupt when a full stroke operation of the shutter button is then performed. However, the DSP/CPU 1 may be configured so as to detect a full stroke operation, i.e., a shutter trigger, of the shutter button without a half stroke operation, i.e., an AF trigger, being detected, and simply execute the AF and AE processing and still image processing at the point in time at which the shutter button is depressed during moving image shooting.

Also, according to the first through sixth embodiments, the object value of frame data immediately preceding the interruption of moving image shooting or the object value of a substitute frame obtained as a result of still image processing is inserted in places where frames are missing. However, the offset value of frame data immediately after the resumption of moving image shooting or the offset value of frame data generated by combining a plurality of pieces of frame data at a prescribed ratio may be inserted in places where frames are missing. Also, the offset value of frame data inserted in places where frames are missing may be transitionally changed to different frame data.

Also according to the first through sixth embodiments, the present invention was applied in an electronic still camera with a moving image shooting function. However, the present invention may be applied in a movie camera with a still image shooting function, a mobile telephone with camera, a PDP with camera, a personal computer with camera, or the like. In short, the present invention can be applied provided the device has with both a moving image shooting function and a still image shooting function.

Also, according to the first through fourth embodiments, it is also possible to bring about a change in the moving image by combining the first through fourth embodiments. For example, inserting the user's favorite moving image frame while moving image shooting is interrupted is possible.

The present invention is not limited to the exemplary embodiments, and can be implemented by making various modifications within a scope that does not depart from the gist of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-324050, filed Nov. 8, 2005, and No. 2006-207169, filed Jul. 28, 2006, which are hereby incorporated by reference herein in their entirety.

What is claimed is:

1. An image sensing apparatus for recording image data image-sensed by image sensing means onto a prescribed storage medium, comprising:

moving image recording means for generating, with each piece of image data obtained as a result of sequential image-sensing by the image sensing means in accordance with a prescribed frame rate as frame data of a moving image, a moving image file on the storage medium by writing each piece of frame data and an offset value showing a storage address of each frame to the storage medium;

judging means for judging whether still image recording has been instructed during the moving image recording by the moving image recording means;

still image recording means for interrupting the moving image recording by the moving image recording means if it is judged by the judging means that still image recording has been instructed, and storing onto the storage medium a still image file with image data obtained by the image sensing means as a still image;

adjusting means for generating a pseudo moving image frame from still image data obtained by the still image recording means and storing the generated pseudo moving image frame as part of the moving image file, and adjusting an offset of each missing frame that is not shot during a time period from when still image shooting by the still image recording means is started until when the still image file is stored onto the storage medium, so that the missing frame points to the pseudo moving image frame; and resuming means for resuming the moving image recording by the moving image recording means after the adjustment by the adjusting means.

2. The apparatus according to claim 1, wherein each frame image recorded by the moving image recording means is generated by thinning pixels from an image extracted at a prescribed line interval by the image sensing means.

3. The apparatus according to claim 1, wherein the adjusting means stores the pseudo moving image frame in a preset offset location, and performs the adjustment so that each missing frame points to the preset offset location.

4. The apparatus according to claim 1, further comprising audio input means, wherein the moving image recording means stores onto the storage medium, with audio data for a preset unit time interval and a number of pieces of frame data to be image-sensed in the unit time interval as one set, each piece of data in the set together with an offset value showing a storage location of the piece of data, and the adjusting means stores a preset blackout frame at a shooting timing of an initial moving image frame of each set included in a first time period from when the moving image recording by the moving image recording means is interrupted until when a pseudo frame is generated as a moving image frame by the adjusting means, and stores an offset value showing a storage address of the blackout frame at a shooting timing of another moving image frame in the first time period, and stores the pseudo frame at a shooting timing of an initial moving image frame of each set included in a second time period from when the pseudo frame is generated until when the still image file is stored by the still image recording means, and stores an offset value showing a storage address of the pseudo frame at a shooting timing of another moving image frame in the second time period.

5. A control method for an image sensing apparatus that records image data image-sensed by image sensing means onto a prescribed storage medium, the method comprising:

a moving image recording step of generating, with each piece of image data obtained as a result of sequential image-sensing by the image sensing means in accordance with a prescribed frame rate as frame data of a moving image, a moving image file on the storage medium by writing each piece of frame data and an offset value showing a storage address of each frame to the storage medium;

a judging step of judging whether still image recording has been instructed during the moving image recording in the moving image recording step;

a still image recording step of interrupting the moving image recording in the moving image recording step if it is judged in the judging step that still image recording has been instructed, and storing onto the storage medium a still image file with image data obtained by the image sensing means as a still image;

an adjusting step of generating a pseudo moving image frame from still image data obtained in the still image recording step and storing the generated pseudo moving image frame as part of the moving image file, and adjusting an offset of each missing frame that is not shot during a time period from when still image shooting in the still image recording step is started until when the still image file is stored onto the storage medium, so that the missing frame points to the pseudo moving image frame; and a resuming step of resuming the moving image recording in the moving image recording step after the adjustment in the adjusting step.

6. An image sensing apparatus for recording image data image-sensed by image sensing means onto a prescribed storage medium, comprising:

moving image recording means for generating, with each piece of image data obtained as a result of sequential image-sensing by the image sensing means in accordance with a prescribed frame rate as frame data of a moving image, a moving image file on the storage medium by writing each piece of frame data and an offset value showing a storage address of each frame to the storage medium;

judging means for judging whether still image recording has been instructed during the moving image recording by the moving image recording means;

still image recording means for interrupting the moving image recording by the moving image recording means if it is judged by the judging means that still image recording has been instructed, and storing onto the storage medium a still image file with image data obtained by the image sensing means as a still image;

adjusting means for adjusting an offset of each missing frame that is not shot during a time period from when still image shooting by the still image recording means is started until when the still image file is stored onto the storage medium, so that the missing frame points to a moving image frame immediately preceding input of the still image recording instruction; and resuming means for resuming the moving image recording by the moving image recording means after the adjustment by the adjusting means.

7. The apparatus according to claim 6, wherein each frame image recorded by the moving image recording means is generated by thinning pixels from an image extracted at a prescribed line interval by the image sensing means.

8. A control method for an image sensing apparatus that records image data image-sensed by image sensing means onto a prescribed storage medium, the method comprising:

a moving image recording step of generating, with each piece of image data obtained as a result of sequential image-sensing by the image sensing means in accordance with a prescribed frame rate as frame data of a moving image, a moving image file on the storage medium by writing each piece of frame data and an offset value showing a storage address of each frame to the storage medium;

a judging step of judging whether still image recording has been instructed during the moving image recording in the moving image recording step;

a still image recording step of interrupting the moving image recording in the moving image recording step if it is judged in the judging step that still image recording has been instructed, and storing onto the storage medium a still image file with image data obtained by the image sensing means as a still image;

an adjusting step of adjusting an offset of each missing frame that is not shot during a time period from when still image shooting in the still image recording step is started until when the still image file is stored onto the storage medium, so that the missing frame points to a moving image frame immediately preceding input of the still image recording instruction; and a resuming step of resuming the moving image recording in the moving image recording step after the adjustment in the adjusting step.

9. An image sensing apparatus for recording audio data input from audio input means and image data image-sensed by image sensing means onto a prescribed storage medium, comprising:

moving image recording means with sound for generating, with audio data for a preset unit time interval and a number of pieces of frame data to be image-sensed in the unit time interval as one set, a moving image file with sound on the storage medium by writing each piece of data in the set to the storage medium together with an offset value showing a storage address of the piece of data;

judging means for judging whether still image recording has been instructed during the moving image recording by the moving image recording means with sound;

still image recording means for interrupting the moving image recording by the moving image recording means with sound if it is judged by the judging means that still image recording has been instructed, and storing onto the storage medium a still image file with image data obtained by the image sensing means as a still image;

audio data storage means for continuing audio input during a time period from when still image shooting by the still image recording means is started until when the still image file is stored onto the storage medium, and storing the audio input onto the storage medium as audio data in each set;

adjusting means for adjusting an offset of a missing frame that results from moving image shooting being interrupted, by storing frame data obtained as a result of image-sensing performed immediately before input of the still image recording instruction, in relation to an initial moving image frame in each set in the time period, and by storing an offset of the moving image frame stored in the set, in relation to a frame in the set excluding the initial moving image frame; and resuming means for resuming the moving image recording by the moving image recording means after the storage of audio data by the audio data storage means and the adjustment by the adjusting means.

10. A control method for an image sensing apparatus that records audio data input from audio input means and image data image-sensed by image sensing means onto a prescribed storage medium, the method comprising:

a moving image recording step with sound of generating, with audio data for a preset unit time interval and a number of pieces of frame data to be image-sensed in the unit time interval as one set, a moving image file with sound on the storage medium by writing each piece of data in the set to the storage medium together with an offset value showing a storage address of the piece of data;

a judging step of judging whether still image recording has been instructed during the moving image recording in the moving image recording step with sound;

a still image recording step of interrupting the moving image recording in the moving image recording step with sound if it is judged in the judging step that still image recording has been instructed, and storing onto the storage medium a still image file with image data obtained by the image sensing means as a still image;

an audio data storage step of continuing audio input during a time period from when still image shooting in the still image recording step is started until when the still image file is stored onto the storage medium, and storing the audio input onto the storage medium as audio data in each set;

an adjusting step of adjusting an offset of a missing frame that results from moving image shooting being interrupted, by storing frame data obtained as a result of image-sensing performed immediately before input of the still image recording instruction, in relation to an initial moving image frame in each set in the time period, and by storing an offset of the moving image frame stored in the set, in relation to a frame in the set excluding the initial moving image frame; and a resuming step of resuming the moving image recording in the moving image recording step after the storage of audio data in the audio data storage step and the adjustment in the adjusting step.

* * * * *